(12) United States Patent
Shiratsuchi et al.

(10) Patent No.: US 12,220,821 B2
(45) Date of Patent: Feb. 11, 2025

(54) ROBOT CONTROL DEVICE

(71) Applicant: Mitsubishi Electric Corporation, Tokyo (JP)

(72) Inventors: Koji Shiratsuchi, Tokyo (JP); Takuya Okahara, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 258 days.

(21) Appl. No.: 18/010,810

(22) PCT Filed: Sep. 14, 2020

(86) PCT No.: PCT/JP2020/034761
§ 371 (c)(1),
(2) Date: Dec. 16, 2022

(87) PCT Pub. No.: WO2022/054292
PCT Pub. Date: Mar. 17, 2022

(65) Prior Publication Data
US 2023/0286150 A1   Sep. 14, 2023

(51) Int. Cl.
*B25J 9/16* (2006.01)

(52) U.S. Cl.
CPC .......... *B25J 9/1664* (2013.01); *B25J 9/163* (2013.01); *G05B 2219/39001* (2013.01); *G05B 2219/39298* (2013.01); *G05B 2219/40519* (2013.01)

(58) Field of Classification Search
CPC ........ B25J 9/1664; B25J 9/163; B25J 9/1694; G05B 2219/39001; G05B 2219/39298;
(Continued)

(56) References Cited

U.S. PATENT DOCUMENTS 4,945,493 A * 7/1990 Huang ............... G05B 19/4083
318/568.22
5,006,999 A * 4/1991 Kuno ................. G05B 19/425
219/124.34
(Continued)

FOREIGN PATENT DOCUMENTS

JP   7-266272 A   10/1995

OTHER PUBLICATIONS

International Search Report and Written Opinion mailed on Oct. 27, 2020, received for PCT Application PCT/JP2020/034761, filed on Sep. 14, 2020, 8 pages including English Translation.

*Primary Examiner* — Jaime Figueroa
(74) *Attorney, Agent, or Firm* — XSENSUS LLP

(57) ABSTRACT

A robot control device includes: a reliability computing unit that is inputted with a feature quantity obtained from a sensor signal indicating a measurement result obtained by an external sensor installed in a main body of a robot or a surrounding environment of the robot, and computes a reliability for the sensor signal on the basis of a temporal change or a spatial change of the feature quantity; a correction command value computing unit that computes a trajectory correction amount for correcting a trajectory of the robot on the basis of the reliability and correction information calculated on the basis of the feature quantity; and a command value generation unit that generates a location command value for the robot on the basis of a predetermined target trajectory of the robot and the trajectory correction amount.

9 Claims, 29 Drawing Sheets

(58) Field of Classification Search
CPC .......... G05B 2219/40519; G05B 2219/39529;
G05B 2219/40584; G05B 2219/40586;
G05B 2219/40607
USPC ................ 700/245–264; 318/568.11–568.25
See application file for complete search history.

(56) References Cited

U.S. PATENT DOCUMENTS

| | | | | |
|---|---|---|---|---|
| 5,570,458 | A * | 10/1996 | Umeno | G05B 19/425 |
| | | | | 700/251 |
| 5,740,341 | A * | 4/1998 | Oota | G06Q 10/06 |
| | | | | 345/420 |
| 5,987,591 | A * | 11/1999 | Jyumonji | B25J 9/1697 |
| | | | | 700/259 |
| 6,611,755 | B1 * | 8/2003 | Coffee | B28C 9/00 |
| | | | | 455/526 |
| 7,425,829 | B2 * | 9/2008 | Zeller | G01V 3/08 |
| | | | | 324/334 |
| 7,865,267 | B2 * | 1/2011 | Sabe | G06V 20/64 |
| | | | | 382/153 |
| 8,774,967 | B2 * | 7/2014 | Ooga | B25J 9/1633 |
| | | | | 700/264 |
| 8,886,359 | B2 * | 11/2014 | Inaba | B25J 9/163 |
| | | | | 700/254 |
| 9,279,661 | B2 * | 3/2016 | Tateno | G06T 7/75 |
| 9,889,566 | B2 * | 2/2018 | Tan | B25J 9/06 |
| 10,556,345 | B2 * | 2/2020 | Kamikawa | B25J 9/1692 |
| 10,813,709 | B2 * | 10/2020 | Hashimoto | B25J 13/06 |
| 10,854,104 | B2 * | 12/2020 | Mettler May | A61B 5/1128 |
| 11,020,859 | B2 * | 6/2021 | Patrick | B25J 5/00 |
| 11,056,012 | B2 * | 7/2021 | Cross | G01C 23/005 |
| 11,161,239 | B2 * | 11/2021 | Ooba | B25J 9/1692 |
| 11,345,040 | B2 * | 5/2022 | Oleynik | G05B 19/4183 |
| 11,510,736 | B2 * | 11/2022 | Rafii-Tari | A61B 34/30 |
| 2005/0077085 | A1 * | 4/2005 | Zeller | G01D 5/2006 |
| | | | | 175/45 |
| 2005/0131581 | A1 * | 6/2005 | Sabe | G05D 1/0251 |
| | | | | 700/245 |
| 2012/0158179 | A1 * | 6/2012 | Ooga | B25J 9/1697 |
| | | | | 901/47 |
| 2012/0296471 | A1 * | 11/2012 | Inaba | B25J 9/1694 |
| | | | | 901/42 |
| 2014/0163737 | A1 * | 6/2014 | Nagata | B25J 9/1697 |
| | | | | 700/259 |
| 2016/0318187 | A1 * | 11/2016 | Tan | B25J 5/007 |
| 2017/0061817 | A1 * | 3/2017 | Mettler May | A61B 5/1124 |
| 2017/0066131 | A1 * | 3/2017 | Kamikawa | B25J 9/1697 |
| 2017/0203434 | A1 * | 7/2017 | Ueda | B25J 9/0081 |
| 2018/0154525 | A1 * | 6/2018 | Tan | B25J 5/007 |
| 2019/0134821 | A1 * | 5/2019 | Patrick | B25J 9/1697 |
| 2019/0183585 | A1 * | 6/2019 | Rafii-Tari | A61B 34/20 |
| 2019/0291277 | A1 * | 9/2019 | Oleynik | B25J 9/1669 |
| 2019/0321967 | A1 * | 10/2019 | Ooba | B25J 13/085 |

* cited by examiner

FEATURE QUANTITY
(BOUNDARY/CENTER OF
BOUNDARY)

RELIABILITY: 90%

FEATURE QUANTITY
(BOUNDARY/CENTER OF
BOUNDARY)

RELIABILITY: 70%

FEATURE QUANTITY
(BOUNDARY/CENTER OF
BOUNDARY)

RELIABILITY: 50%

ROBOT CONTROL DEVICE

CROSS-REFERENCE TO RELATED APPLICATION

The present application is based on PCT filing PCT/JP2020/034761, filed Sep. 14, 2020, the entire contents of which are incorporated herein by reference.

FIELD

The present disclosure relates to a robot control device for controlling a robot.

BACKGROUND

In a conventional robot control device, highly accurate positioning control has been performed on the basis of location information outputted from an encoder, for example. In recent years, robot control for which a vision sensor or a force sensor is used as an external sensor has been applied in order to cope with a positioning error caused by lot variation or the like of a workpiece. While such control adapted to variation in positioning accuracy of a workpiece has been proposed, highly accurate control may be difficult in some cases as a signal level of a sensor detection signal is not stable due to an influence of a disturbance or the like.

In order to solve such a problem, Patent Literature 1 discloses a technique for achieving higher accuracy of control, by performing weighted averaging on a plurality of pieces of data outputted from a vision sensor on the basis of reliability of each piece of data, and correcting an operation command for a manipulator with use of data obtained by the averaging.

CITATION LIST

Patent Literature

Patent Literature 1: Japanese Patent Application Laid-open No. H7-266272 (JPH07266272 (A)).

SUMMARY

Technical Problem

In a robot control device that operates a robot on the basis of a sensor signal indicating a measurement result obtained by a sensor, it is expected to autonomously change an action on the basis of the sensor signal. Here, the technique described in Patent Literature 1 is to perform weighted averaging on a plurality of pieces of data obtained on a time series basis from a sensor, but highly accurate control can be expected to be achieved even in a case where a plurality of sensors are installed in a robot system, and data (sensor signals) outputted from the individual sensors is subjected to weighted averaging and used for control. However, in a case of using a plurality of sensors of the same type, there has been a case where a stable operation is not realized if the operation is controlled on the basis of only a sensor signal outputted from each sensor. For example, depending on a disturbance such as a change in environmental light, all the sensor signals may no longer be normally outputted. In this case, even if an operation command of the robot is corrected using a result of the weighted averaging of the plurality of pieces of data (sensor signals) as described in Patent Literature 1, there may be a case where an expected operation can no longer be performed, and any operation in a wrong direction causes interference with surroundings to damage a system. In order to avoid the system damage, it is possible to take a measure of uniformly lowering a speed of the robot operation in advance. However, as a result of that measure, a decrease in production efficiency due to a delay in work has been considered problematic.

The present disclosure has been made in view of the above circumstances, and an object thereof is to provide a robot control device for controlling a robot with high accuracy in a robot system utilizing a sensor signal, and achieving a robot operation without reducing production efficiency in a production system.

Solution to Problem

In order to solve the above-mentioned problems and achieve the object, the present disclosure provides a robot control device comprising: a reliability computing unit to which a feature quantity obtained from a sensor signal is inputted, to compute a reliability for the sensor signal based on a temporal change or a spatial change of the feature quantity, the sensor signal indicating a measurement result obtained by an external sensor installed in a main body of a robot or a surrounding environment of the robot; a correction command value computing unit to compute a trajectory correction amount for correcting a trajectory of the robot, based on the reliability and correction information that is calculated based on the feature quantity; and a command value generation unit to generate a location command value for the robot based on a target trajectory of the robot and the trajectory correction amount, the target trajectory being determined in advance.

Advantageous Effects of Invention

A robot control device according to the present disclosure has an advantageous effect that it can achieve higher accuracy of control of a robot and prevention of a decrease in production efficiency in a production system.

DESCRIPTION OF EMBODIMENTS

Hereinafter, a robot control device according to an embodiment of the present disclosure will be described in detail with reference to the drawings.

First Embodiment

Figure 1:
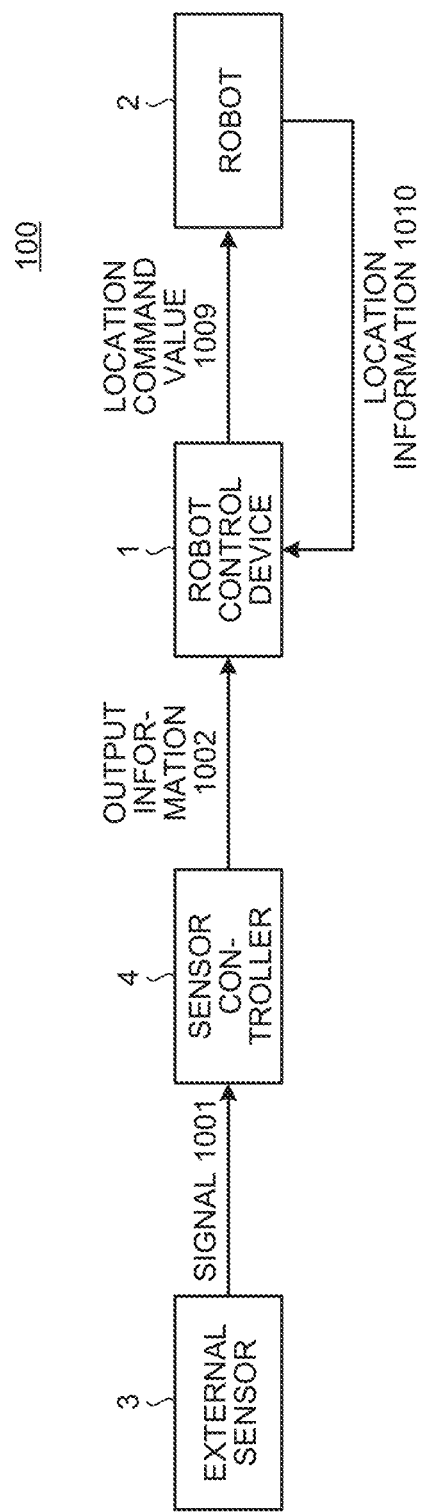
FIG. 1 is a diagram illustrating a configuration example of a robot system implemented by applying a robot control device according to a first embodiment.

FIG. 1 is a diagram illustrating a configuration example of a robot system 100 implemented by applying a robot control device 1 according to a first embodiment.

The robot system 100 includes the robot control device 1, a robot 2, an external sensor 3, and a sensor controller 4. Note that the configuration of the robot system 100 is similar to that of a conventional robot system. That is, the robot system 100 has a configuration in which a robot control device of the conventional robot system is replaced with the robot control device 1 according to the present embodiment described later.

The robot control device 1 is connected to a main body of the robot 2, computes a control command value for the robot 2, and transmits an electric current value to a motor via a driver unit (not illustrated) in the robot 2 to drive the motor. Examples of the control command value for the robot 2 include a location command value, a speed command value, and a torque command value that is also referred to as an acceleration command value. On the basis of these control command values, the driver unit computes a motor current value to be outputted to the motor. In the example illustrated in FIG. 1, the control command value for the robot 2 is set to be a location command value 1009. Also in the following, description will be given for an example in which the control command value is a location command value that is one of control command values of a general industrial robot controller.

It is notable that, by providing a plurality of external sensors 3 in a main body or a surrounding environment of the robot 2, the robot can be operated in accordance with a change in the surrounding environment occurring around the robot system. Examples of the external sensor 3 include a vision sensor, a motion tracker, a force sensor, a tactile sensor, a proximity sensor, and the like. Control performed by measuring a recognition target that is a work target object using these external sensors 3 and generating or correcting a command value (a location command value in the present embodiment) on the basis of a feature quantity computed based on a result of measurement refers to a control method based on one or more external sensors.

Hereinafter, a control operation of the robot performed by the robot control device 1 according to the first embodiment will be described in more detail together with a problem to be solved.

First, the problem will be described. In robot control for operating a robot on the basis of a recognition result subjected to signal processing or information processing, a plurality of sensors may be used as described above, but there is an implicit premise that a control system using a plurality of sensors of the same type is under the condition that "any one of the sensors operates stably", and so a control system design for an unexpected state has been a problem in the conventional art. In addition, in a case where a plurality of different types of sensors are used, designing feedback control independently for each of the two or more sensors has been the main focus, and designing for performing robot control while switching the two or more sensors in accordance with a work state has not been able to be realized.

For example, a disturbance such as a change in environmental light may cause a significant change in a sensor signal indicating a measurement result obtained by the sensor, and as a result, a feature quantity of the sensor signal may no longer be normally outputted. That is, a sensor signal indicating an anomalous value may be outputted from the sensor. The case where a sensor signal is not normally outputted corresponds to, for example, a case where a target point indicated by a feature quantity obtained by performing signal processing on a sensor signal suddenly changes greatly although the robot to be controlled is moving slowly, a case where the feature quantity is no longer outputted, a case where several target point candidates that are erroneously recognized among a plurality of target point candidates are outputted as different target points at each timing at which the target point is outputted, or other cases like these cases.

In one of these cases, even if a result of weighted averaging of a plurality of sensor signals with the method described in Patent Literature 1 is used in robot control, an expected operation may not always be performed. That is, in a case where a likelihood of a measurement result indicated by the sensor signal or a feature quantity of the measurement result is defined as "reliability", the following two states are caused when the reliability has decreased significantly. The first state refers to "a case where the operation of the robot can be continued by selecting an appropriate sensor output, in a case of a system including a plurality of sensors". The second state refers to "a case where a sensor signal level or a feature quantity extraction level is below an assumed level, a command value significantly fluctuates to cause the robot to become out of control, and there is a risk of possibly causing work failure if the robot continuously operates". In the robot control proposed so far, there has been no framework in which the control output can be automatically adjusted when any one of the above two states is caused.

Figure 2:
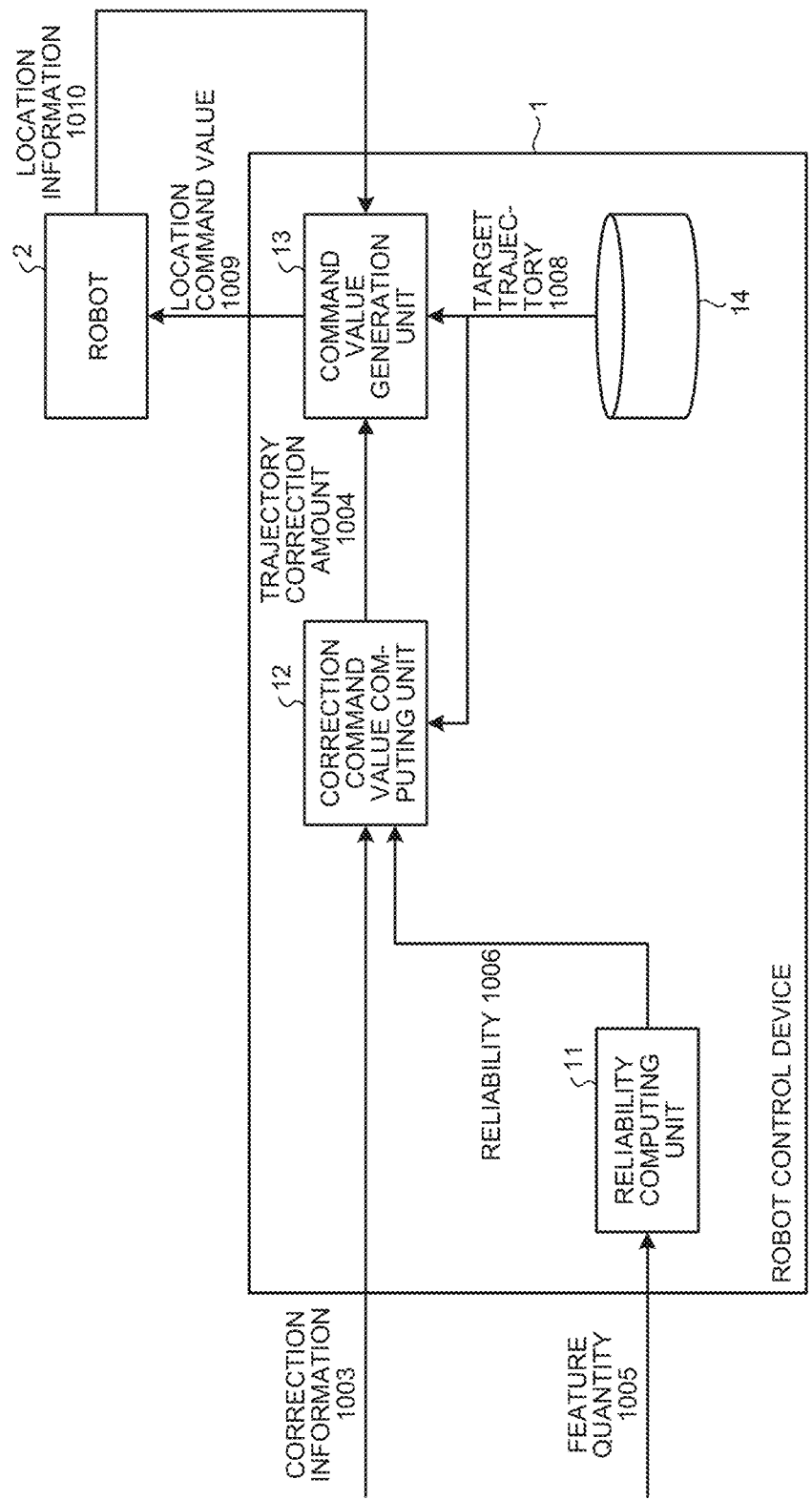
FIG. 2 is a diagram illustrating a configuration example of the robot control device according to the first embodiment.

FIG. 2 is a diagram illustrating a configuration example of the robot control device 1 according to the first embodiment. Note that FIG. 2 also illustrates the robot 2 controlled by the robot control device 1 in combination.

The robot control device 1 includes a reliability computing unit 11, a correction command value computing unit 12, a command value generation unit 13, and a target trajectory holding unit 14.

The reliability computing unit 11 receives, as its input, a feature quantity 1005 obtained by the sensor controller 4 analyzing a sensor signal outputted from the external sensor 3 illustrated in FIG. 1, and calculates a reliability Pc of the sensor signal on the basis of a change quantity of the inputted feature quantity 1005. Note that the sensor signal corresponds to a signal 1001 illustrated in FIG. 1. In addition, the feature quantity 1005 is included in output information 1002 of the sensor controller 4 illustrated in FIG. 1. The reliability computing unit 11 outputs the calculated reliability Pc as a reliability 1006 to the correction command value computing unit 12.

The correction command value computing unit 12 receives, as its inputs, the reliability 1006 and correction information 1003 that is calculated by the sensor controller 4 on the basis of the feature quantity 1005 mentioned above, and calculates a trajectory correction amount for correcting a trajectory of the robot 2 on the basis of the inputted information pieces. Note that the correction information 1003 is included in the output information 1002 of the sensor controller 4 illustrated in FIG. 1. The correction command value computing unit 12 outputs a calculated trajectory correction amount 1004 to the command value generation unit 13.

The command value generation unit 13 receives, as its inputs, the trajectory correction amount 1004, a target trajectory 1008 outputted by the target trajectory holding unit 14 configured to hold a target trajectory programmed in advance, and location information 1010 of the robot 2 outputted by the robot 2, and generates a location command value for the robot 2 on the basis of the inputted information pieces. The target trajectory 1008 represents a trajectory of the robot 2 determined in advance by means of programming. The trajectory represents a data group in which a robot location command value at a certain time instant t in a three-dimensional domain is expressed at an interval of a certain time width $\Delta t$. A part of the information on the target trajectory is a location command value at a certain time. Note that the location information 1010 is generated by an internal sensor included in the robot 2. The command value generation unit 13 outputs the generated location command value 1009 to the robot 2.

It is notable that, in the present embodiment, a configuration is adopted in which the sensor controller 4 performs signal processing on each of sensor signals outputted from one or more external sensors 3 to obtain the feature quantity 1005 and the correction information 1003 corresponding to each sensor signal, but a configuration may be adopted in which the robot control device 1 performs signal processing for obtaining the feature quantity 1005 and the correction information 1003. The configuration in the latter case will be described later as another embodiment.

Hereinafter, processing performed by the reliability computing unit 11, the correction command value computing unit 12, and the command value generation unit 13 of the robot control device 1 will be described.

Figure 3:
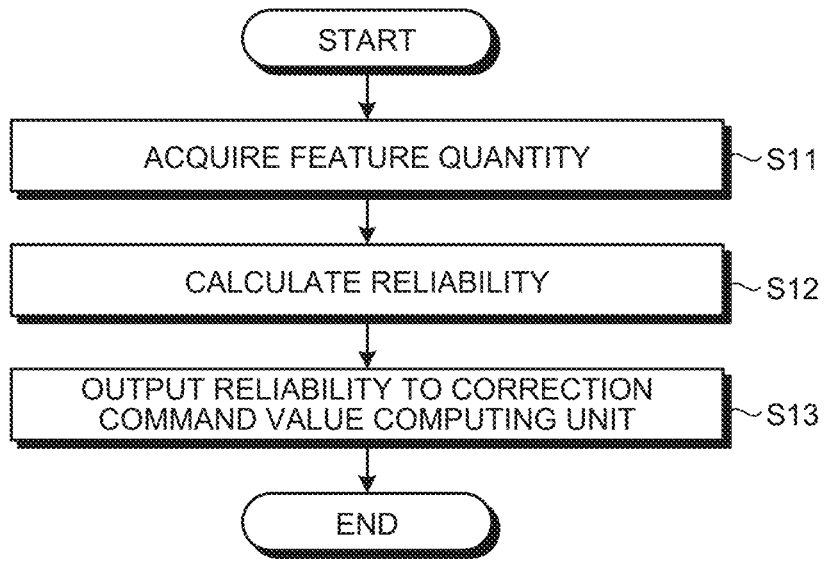
FIG. 3 is a flowchart illustrating an example of an operation of a reliability computing unit of the robot control device according to the first embodiment.

FIG. 3 is a flowchart illustrating an example of an operation of the reliability computing unit 11 of the robot control device 1 according to the first embodiment.

As illustrated in FIG. 3, the reliability computing unit 11 acquires the feature quantity 1005 (hereinafter, referred to as a feature quantity Vk in some cases) outputted from the sensor controller 4 (step S11), and calculates the reliability Pc on the basis of the feature quantity Vk (step S12). Then, the reliability computing unit 11 outputs the calculated reliability Pc to the correction command value computing unit 12 (step S13).

Here, the reliability Pc is defined by a real number in a range from 0 to 1. While the feature quantity Vk and the reliability Pc will be described later in detail, the feature quantity Vk is calculated with use of a sensor signal Sk(t) outputted at the time t by a certain external sensor SENk (k=1, 2, . . . ) as an input, by using a feature quantity Vk(t) that is a scalar quantity expressed by quantifying the sensor signal Sk(t) in a determined step of conversion processing or by using a feature quantity vector Vec_Vk(t). When there is the feature quantity Vk(t) as time-series information that is a transition of the feature quantity Vk for the time t, a feature quantity Vk(X) based on a space, or a feature quantity Vk(t, X) that changes with time and space, the reliability computing unit 11 calculates the reliability Pc. That is, on the basis of a model or an assumption predicted in advance, for example, based on the use of an upper limit Vth of an expected change, the reliability computing unit 11 calculates the reliability Pc by indexing a deviation from the expected upper limit Vth on the basis of the presence or absence of a change in the feature quantity Vk exceeding the upper limit Vth, a magnitude relationship between the feature quantity Vk and the upper limit Vth, or the like. Details of the feature quantity Vk and the reliability Pc will be described later.

Note that, in the following description, in a case where a sensor signal outputted by the external sensor SENk is expressed without considering time, the sensor signal is expressed as Sk, and a reliability of the sensor signal (Sk) outputted by the external sensor SENk is expressed as Pc(k).

Figure 4:
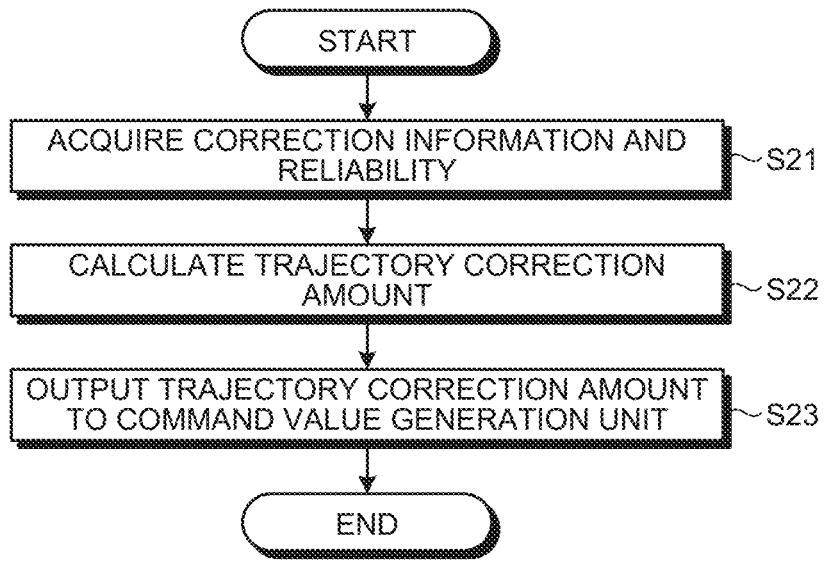
FIG. 4 is a flowchart illustrating an example of an operation of a correction command value computing unit of the robot control device according to the first embodiment.

FIG. 4 is a flowchart illustrating an example of an operation of the correction command value computing unit 12 of the robot control device 1 according to the first embodiment.

As illustrated in FIG. 4, the correction command value computing unit 12 acquires the correction information 1003 outputted from the sensor controller 4 and the reliability 1006 (Pc(k)) outputted from the reliability computing unit 11 (step S21), and calculates the trajectory correction amount 1004 on the basis of the correction information 1003 and the reliability 1006 (step S22). Then, the correction command value computing unit 12 outputs the calculated trajectory correction amount 1004 to the command value generation unit 13 (step S23).

In step S22, the correction command value computing unit 12 obtains a correction coefficient by weighting, with the reliability Pc(k), the correction information 1003 (correction information ΔXck) based on the sensor signal Sk outputted from each external sensor 3, and calculates the trajectory correction amount 1004 with use of this correction coefficient. For example, the correction command value computing unit 12 calculates a trajectory correction amount ΔXd on the basis of the following Equations (1) and (2), with setting a correction coefficient Ck (k=1, 2, . . . ). "fnc" in Equation (2) represents a function of obtaining the correction coefficient Ck from the reliability Pc(k). In Equation (1), a product of the correction coefficient Ck and the correction information ΔXck is calculated as a component of a trajectory correction amount for each sensor, and a sum of all the products is obtained for the whole of sensors and outputted.

$$\Delta Xd = \Sigma(Ck \cdot \Delta Xck) \quad (1)$$

$$Ck = fnc(Pc(k)) \quad (2)$$

Note that, further, a configuration may also be adopted in which the target trajectory is inputted to the correction command value computing unit 12. In this case, an upper limit value and a correction direction can be limited for the trajectory correction amount ΔXd. For example, an upper limit value ΔXdlim of the trajectory correction amount ΔXd and a direction for correction thereof can be limited with using a location command value Xd to be a reference as an input. Specifically, there is a case where correction is applied only to a direction perpendicular to the target trajectory, or a case where one or more of X, Y, and Z for a robot tool coordinate system or attitudes A, B, and C around X, Y, and Z axes are selected, and correction is applied only to a direction for the selection.

Figure 5:
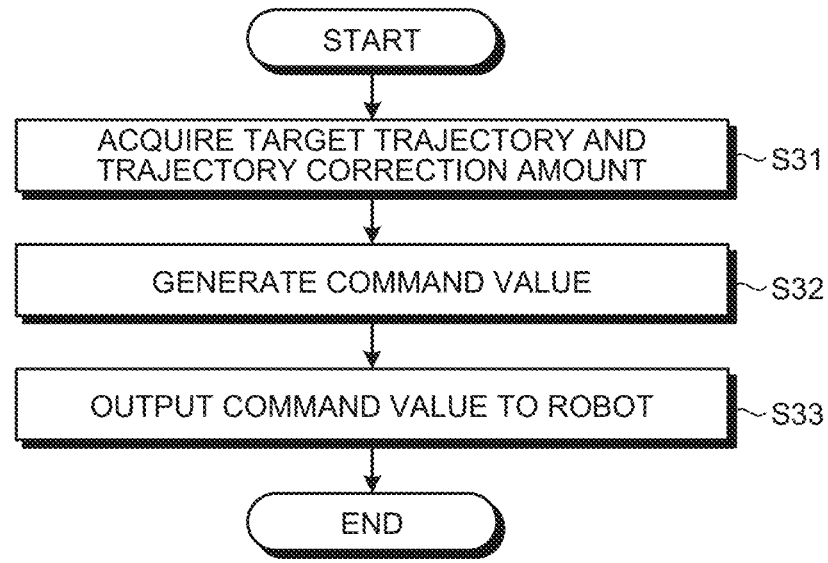
FIG. 5 is a flowchart illustrating an example of an operation of a command value generation unit of the robot control device according to the first embodiment.

FIG. 5 is a flowchart illustrating an example of an operation of the command value generation unit 13 of the robot control device 1 according to the first embodiment.

As illustrated in FIG. 5, the command value generation unit 13 acquires the target trajectory 1008 outputted from the target trajectory holding unit 14 and the trajectory correction amount 1004 (ΔXd) outputted from the correction command value computing unit 12 (step S31), and generates a command value on the basis of the target trajectory 1008 and the trajectory correction amount 1004 (step S32). The command value generation unit 13 outputs the generated command value to the robot 2 (step S33). In this example, the command value generation unit 13 generates the location command value 1009 as a command value.

In step S32, for example, when a command value is Xout(t), a trajectory correction amount is ΔXd(t), and a target trajectory is Xd (t) at the time t, the command value generation unit 13 generates a command value according to the following Equation (3).

$$Xout(t) = Xd(t) + \Delta Xd(t) \quad (3)$$

If correction information (herein, referring to the trajectory correction amount ΔXd) of the target trajectory Xd(t) is not inputted, the command value generation unit 13 outputs the original target trajectory Xd(t) as the command value Xout(t) to operate the robot 2.

Further, an alternative configuration of the command value generation unit 13 can also adopted in which the unit 13 generates a command value according to the following Equation (4) using ΣΔXd(t) as a form obtained by integrating the correction amounts so far.

$$Xout(t) = Xd(t) + \Sigma \Delta Xd(t) \quad (4)$$

A method for achieving the command value Xout is not particularly limited to the contents shown in Equation (3) or Equation (4) described above, as long as the target trajectory Xd(t) and the trajectory correction amount ΔXd(t) are used.

Note that, expression has been made by a manner that the target trajectory 1008 is given in advance at any time, but the robot control device 1 can be similarly applied to a case where the target trajectory is recalculated online for a certain start point Xs and end point Xe during the operation of the robot control device 1. That is, the target trajectory Xd(t) may be updated during the operation of the robot control device 1. Further, the robot control device 1 can also be similarly applied to a case where the target trajectory 1008 inputted to the command value generation unit 13 is set for one-time command value (a location command value Xd (t+1) next to a location command value Xd (t) currently being executed, of a series of location command values representing the target trajectory) or other cases like that.

Hereinafter, in order to describe the configuration of the present embodiment, definitions of the feature quantity Vk and the reliability Pc will be described.

In control based on a sensor signal outputted by the external sensor 3, first, signal processing or information processing is executed using a measurement result (a sensor signal) of the external sensor 3 to obtain a feature quantity. There are various forms of the feature quantity according to types of the external sensor 3, but it is common that conversion processing is performed on a sensor signal Sk(t) of a certain external sensor SENk (k=1, 2, . . . ) at a time t, and the calculation is performed using a scalar quantity Vk(t) expressed by quantification for the feature quantity or a vector quantity vec_Vk(t) therefor. The vector quantity vec_Vk(t) is used when one feature quantity to be handled can be expressed by being further converted into a plurality of independent physical quantities. For example, in a case where hue (RGB), luminance (brightness/darkness), and the like are defined for one pixel, the feature quantity is handled as a vector quantity vec_Vk(t).

Figure 6:
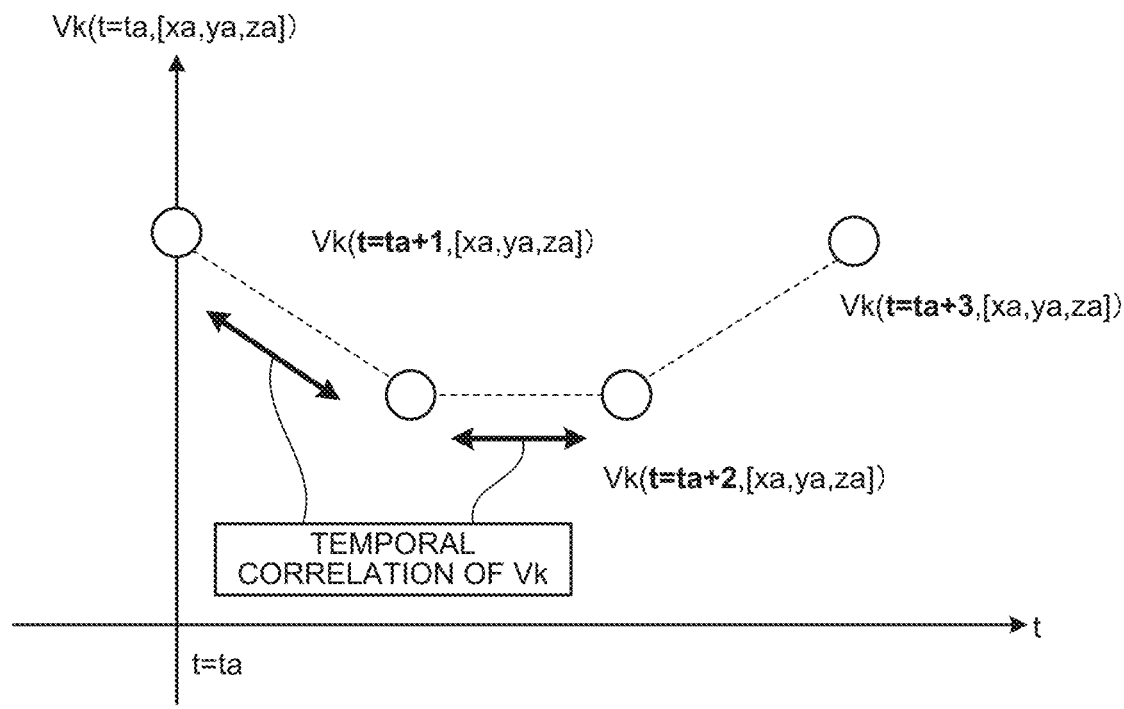
FIG. 6 is a first diagram for explaining a definition of a feature quantity handled by the robot control device according to the first embodiment.
Figure 7:
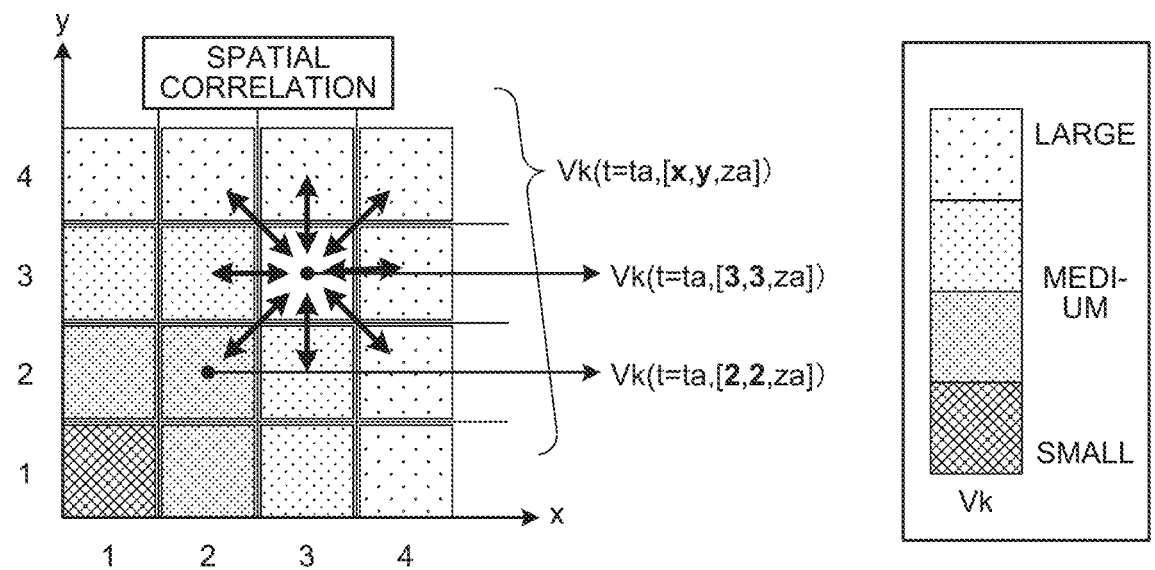
FIG. 7 is a second diagram for explaining a definition of a feature quantity handled by the robot control device according to the first embodiment.

At this time, as illustrated in FIG. 6, when the feature quantity Vk is evaluated in chronological order, data is acquired as Vk(t=ta+i) (i=1, 2, 3, . . . ), with using t=ta as a data collection start point. In addition, when the feature quantity Vk is evaluated in terms of a space, the feature quantity Vk is expressed in a form of Vk(t=ta, [x, y, za]) as illustrated in FIG. 7. Variables include time information t and point information [x, y, z]. In this case, point information z=za is a fixed value. In addition, for x and y, a case is represented in which sensor elements are arranged on a sensor coordinate system, and sensors are arranged in a lattice pattern in an x direction and a y direction. As the feature quantity Vk, for example, color information, luminance information, and the like in each pixel of a vision sensor expressed by the number of pixels of 480×640 can be exemplified. When a feature quantity at a point Xa is Vk(ta, Xa) as a space at the same time t=ta, a plurality of points Xa are simultaneously evaluated. Furthermore, there is a case where a spatial spread of the point Xa is captured in chronological order. Note that a configuration may also be adopted in which an Euler angle, a quaternion, or the like is further added to the point information, as attitude information in a space.

Additionally, as the feature quantity, an electric signal of the external sensor SENk can be converted into and expressed as the feature quantity Vk(t) equivalent to a physical quantity. Examples of this process include a process of converting a change in electric current flowing through a strain gauge into a value equivalent to a value of a force, for example. Examples of the physical quantity include a distance, an acceleration, a speed, a rotational speed, a strain amount, an axial force, and a moment. These physical quantities can be used in such a way that the acquired physical quantity is compared with a preset threshold value, or proportional integral differential (PID) control is performed based on a difference between the acquired physical quantity and a target value of the physical quantity. In addition, there is also a method of taking out these physical quantities for a certain number of samples (that is, Vk(t), t0≤t≤t1) from a time t0 to a time t1, and using machine learning or the like to re-extract the quantities as new feature quantities as waveform patterns or waveform feature quantities. As another feature quantity using an information quantity in a certain range, there are a contour line and a location of a recognition target obtained through image processing, or similarity between the recognition target and a target in a list that has been produced in advance, with using, as an input, a set of pixels Vk(t0, [jx, jy]) in a certain range acquired by a camera or the like at the time t0 (that is, image information Vk(t0, [jx, jy]) having a spread as a plane, 0≤jx≤480, 0≤jy≤640).

In the robot control device 1, the feature quantity Vk is used for the purpose of "whether or not an object captured on the external sensor 3 is a target object (i.e., identification)", "where a target object is located on the coordinate system of the external sensor 3 (i.e., recognition, location estimation)", and "calculation or extraction of a distinction and a difference between a target state and a current state of a target object, calculation or extraction of a distinction or a difference therebetween (i.e., recognition, difference extraction)".

The feature quantity Vk may be used for the purpose of recognizing a distinction from a target feature quantity Vd and performing feedback control of the robot. When the sensor signal Sk(t) is a physical quantity after calibration processing is performed as in a case of an acceleration sensor or a force sensor, the feature quantity Vk is used for feedback control such that the physical quantity directly becomes a desired value.

On the other hand, there is a case where a second feature quantity is further extracted from a first feature quantity that is a feature quantity extracted from a sensor signal, and processing is performed using the second feature quantity. For example, rather than data of the first feature quantity (image information) itself such as image information extracted from a sensor signal, information may be used such as a location, a direction and/or the like obtained through data processing such as edge extraction processing for further extracting a contour in the image information with using the first feature quantity as an input, or principal component analysis processing on image information, in which a direction of a target object is further extracted with using the first feature quantity as an input. This corresponds to extracting the second feature quantity from the first feature quantity. Determination processing, feedback control, or the like may be performed using the second feature quantity.

Further, in the extraction of the second feature quantity, various technical manners may be applied, such as a manner of cutting out a part of time-series data and learning with regarding the part as a waveform pattern, or a manner of acquiring a target state by means of supervised machine learning from huge volumes of advance data.

Here, correction information generated from the feature quantity to be used to cause a transition of a work target object to the target location will be described. In the present embodiment, a correction amount of a location of a robot hand tip based on an acting force between the robot 2 and the work target object can be exemplified as the correction information 1003. Specifically, a value at a time T of a force sensor output that is an output after a measurement amount S1(sk, k=1) outputted from a force sensor with 6 degrees of freedom is calibrated in units of force or torque [N or Nm] is set as a feature quantity V1(T). At this time, in order to perform control such that a force is not excessively applied to a robot end effector, a correction amount ΔXck of a location of the robot hand tip can be defined on the basis of the feature quantity V1(T), with a target value of the force being set as the target value Vd of the feature quantity. When an appropriate coefficient K1 is set under the above-mentioned definition, the correction amount ΔXck(T) can be obtained from the feature quantity V1(T) in accordance with the following Equation (5).

$$\Delta Xck(T)=K1 \cdot (Vd-V1(T)) \qquad (5)$$

In this example, the correction amount ΔXck(T) is a location correction amount (one form of the correction information 1003). In addition, as the correction amount ΔXck(T), correction amounts such as a speed correction amount, an acceleration correction amount, and a jerk correction amount are calculated on the basis of the feature quantity Vk.

Note that, in the present specification, what is covered by the expression of "location" used for a target location or the like is a three-dimensional spatial degrees of freedom having a total of six degrees of freedom with a location being in three degrees of freedom and an attitude being in three degrees of freedom, which is equivalent to location information and attitude information on a robot distal end portion that is uniquely determined by a location in translation directions of X, Y, and Z on a robot coordinate system Σrob and rotations about X, Y, and Z axes. The other examples include, on the basis of the external sensor 3, a movement speed of the recognition target, a moving acceleration of the recognition target, a force (an acting force) generated according to a contact state between the robot 2 and some external part, and a relative distance, a relative location, a relative speed, and a relative acceleration between a robot hand tip location and the recognition target. Also in these examples, speed information and acceleration information are similarly expressed with omitting a rotational speed and a rotational acceleration. In practice, a total of six degrees of freedom having three degrees of freedom in the translation directions and three degrees of freedom in the rotation directions are handled.

Next, a method of calculating a reliability on the basis of a feature quantity will be described.

Regarding a feature quantity Vk (k=1, 2, . . . ) obtained with a sensor signal Sk that is an output of an external sensor SENk (k=1, 2, . . . ), a reliability Pc for the feature quantity Vk (k=1, 2, 3, . . . ) based on each sensor signal Sk (k=1, 2, . . . ) is defined on the basis of correlation information on two or more feature quantities, for the feature quantity Vk(t, X= [x, y, z]) that is different in terms of time t (t=1, 2, . . . ) of the feature quantity Vk or in terms of a space X (X= [x, y, z]) thereof.

The reliability Pc is defined on the basis of the presence or absence of a change in Vk exceeding an upper limit of a change expected based on a model and an assumption predicted in advance, when there is the feature quantity Vk defined in association with the time t and the space X. Since a calculation method of the reliability Pc differs for each type of the feature quantity Vk, the description will be separated from one another of the types.

Figure 8:
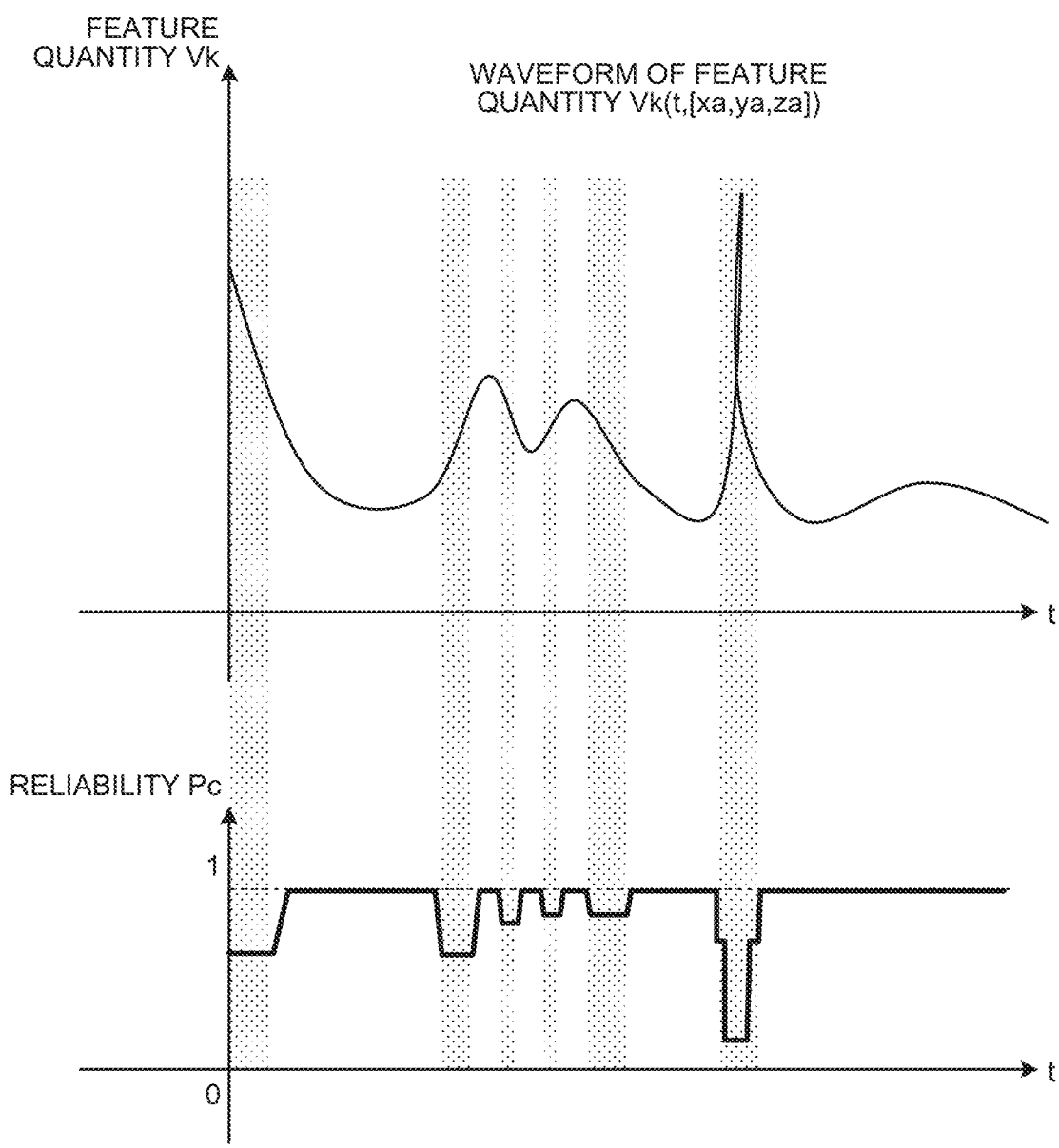
FIG. 8 is a graph for explaining a first example of a method in which the reliability computing unit according to the first embodiment calculates a reliability.

First, a method of calculating the reliability Pc in a case where the feature quantity Vk is "Vk(t)" to be handled on a time series basis will be described. FIG. 8 is a graph for explaining a first example of a method for the reliability computing unit 11 according to the first embodiment to calculate the reliability Pc.

As illustrated in FIG. 8, in a case where the feature quantity Vk is time-series information Vk(t, [xa, ya, za]), the reliability Pc is obtained on the basis of Vk(ta−i) (i=1, 2, 3, . . . ) that is a past history of a feature quantity Vk(ta) at a certain time ta.

Specifically, the reliability Pc is obtained on the basis of whether or not a change quantity per unit time of the current feature quantity Vk(ta) exceeds an upper limit value ΔVth of the change quantity. In another method, the reliability Pc can also be obtained on the basis of whether or not a moving average of the feature quantity Vk exceeds the upper limit value ΔVth, with use of the upper limit value ΔVth and an average value (that is, the moving average) of a history of the feature quantity Vk in a certain time width T. In addition, the upper limit value ΔVth can also be defined as an upper limit for direct comparison with an immediately preceding value, that is, for a difference between two temporally adjacent feature quantities Vk. Here, in the example illustrated in FIG. 8, the reliability Pc can be expressed by the following Equations (6) and (7).

$$Pc=[\{Vk(t)-Vk(t-1)\}/\Delta t-\Delta Vth] \text{ if } \{Vk(t)-Vk(t-1)\}/\Delta t > \Delta Vth \quad (6)$$

$$Pc=1 \text{ if } \{Vk(t)-Vk(t-1)\}/\Delta t \leq \Delta Vth \quad (7)$$

Next, a method of calculating the reliability Pc in a case where the feature quantity Vk is a spatially handled "Vk(ta, [x, y, za])" will be described.

In a case where the feature quantity Vk is the spatial information Vk(ta, [x, y, za]), the reliability Pc is used for evaluating how a distribution of Vk(t, [x, y, z]) in a space is, on the basis of spatial information Vk(ta, [x, y, za]) at a certain point [x, y, za] (ex. x=1, 2, 3, . . . ; y=1, 2, 3, . . . ; z=za (fixed)) in a space having spread on a plane in the X and Y directions at the certain time ta. As compared with a case of focusing only on the feature quantity Vk in time series, an information amount is large in a case of spatially handling, and it is possible to determine that "a target object in the space is moving" or "something suddenly appears in front of the work target object" by searching a calculation range of a certain quantity of the feature quantity Vk(ta, [x, y, za]). As an example, an image obtained using an RGB camera corresponds to the feature quantity Vk that is spatially handled. In addition, this consideration similarly applies to a sensor signal obtained from a sensor array in which sensors are arranged in a lattice pattern.

Figure 9:
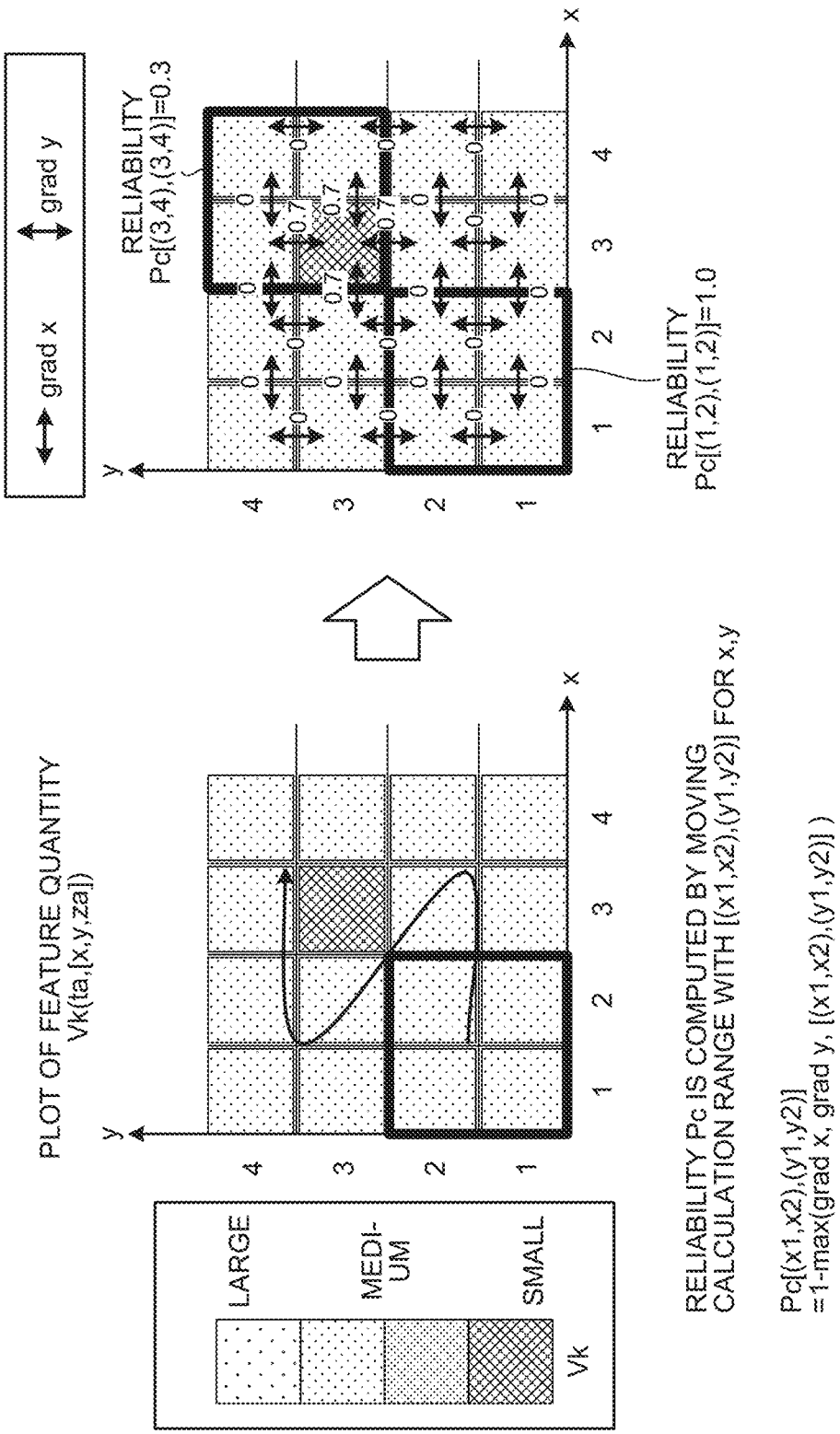
FIG. 9 is a diagram for explaining a second example of a method in which the reliability computing unit according to the first embodiment calculates a reliability.

Since such a feature quantity Vk(t, [x, y, z]) has a large information quantity, the reliability Pc may be calculated after the quantity is converted into a second feature quantity Vk2 that is lower in dimension and easier to control. An operation of the reliability computing unit 11 in this case will be described with reference to FIG. 9. FIG. 9 is a diagram for explaining a second example of a method in which the reliability computing unit 11 according to the first embodiment calculates the reliability Pc. In the example illustrated in FIG. 9, the reliability computing unit 11 generates the second feature quantity Vk2 (t, [X1, X2]) from information regarding a certain point X1 and a point X2 adjacent thereto. In the example of FIG. 9, it is assumed that gradient information pieces "grad x" and "grad y" are obtained as the second feature quantity Vk2. The "grad x" indicates a gradient of the feature quantity Vk in an x-axis direction, and the "grad y" indicates a gradient of the first feature quantity Vk in a y-axis direction. The gradient information is calculated on the basis of a difference between the feature quantities Vk described above which are spatially adjacent to each other. In the case of the example of FIG. 9, the feature quantity Vk is a very small value at (x, y)=(3, 3). In this situation, for example, in a case where there is a certain premise that "there is no steep change in Vk in a neighboring space", the reliability can be obtained by a method described below.

In this example, an example of a case where the reliability is calculated with defining a certain calculation range will be described. Hereinafter, a range of x1 to x2 and y1 to y2 illustrated in FIG. 9 is expressed as [(x1, x2), (y1, y2)]. In this case, the reliability in this range is expressed by the following Equation (8).

$$Pc[(x1,x2), (y1,y2)] = 1 - \max(\text{grad}x, \text{grad}y, [(x1,x2), (y1,y2)]) \quad (8)$$

In the calculation of the reliability expressed by Equation (8), [grad x] and [grad y] in a frame surrounded by a bold line illustrated in FIG. 9 are used as an input, a gradient having a maximum value is sought from a total of four gradients that have been inputted, and the reliability is made lower as the gradient is larger, on the basis of the maximum value of the gradient. The gradient said herein means a change quantity between two spatially adjacent feature quantities. In the example illustrated in FIG. 9, the feature quantity Vk at (x, y)=(3, 3) is smaller than surroundings thereof, and the feature quantities Vk at points other than (x, y)=(3, 3) are equal. In addition, gradients between the feature quantity Vk at (x, y)=(3, 3) and the feature quantities Vk at points adjacent thereto are all 0.7. Therefore, Pc [(x1, x2), (y1, y2)]=1.0 is obtained in a range in which (x, y)=(3, 3) is not included, and Pc [(x1, x2), (y1, y2)]=0.3 is obtained in a range in which (x, y)=(3, 3) is included. For example, as illustrated in FIG. 9, the reliability of the range [(1, 2), (1,2)] is Pc [(1, 2), (1, 2)]=1.0, and the reliability of the range [(3,4), (3,4)] is Pc [(3, 4), (3, 4)]=0.3.

As described above, the feature quantity Vk is defined as a generic term of information obtained by converting the sensor signal Sk outputted by the external sensor 3 into numerically computable information such as a physical quantity. In addition, in a case where there is the feature quantity Vk based on a time series or a space, on the basis of a model or an assumption predicted in advance, for example, on the basis of the upper limit Vth of the expected change, the reliability Pc is calculated from the presence or absence of a change in Vk exceeding the upper limit Vth, a magnitude relationship between Vth and Vk, or the like.

The reliability Pc defined in this way is superior to a conventional reliability used in the technique described in Patent Literature 1 listed above, in the following respects. As to the conventional reliability, for a feature quantity as output data from a sensor or distance information, a likelihood of its output is directly defined as the reliability by using an "absolute quantity of the output". On the other hand, after the sensor signal Sk that is a sensor output is converted into the feature quantity Vk, the reliability Pc used in the robot system 100 according to the present embodiment is defined on the basis of a chronological or spatial change between one and the next of the feature quantities. Since there is this difference, the robot control device 1 according to the present embodiment can control the robot 2 with higher accuracy in consideration of one or both of the feature quantity Vk(t) that is a temporally past history and the feature quantity Vk(X) in a neighboring space.

Figure 10:
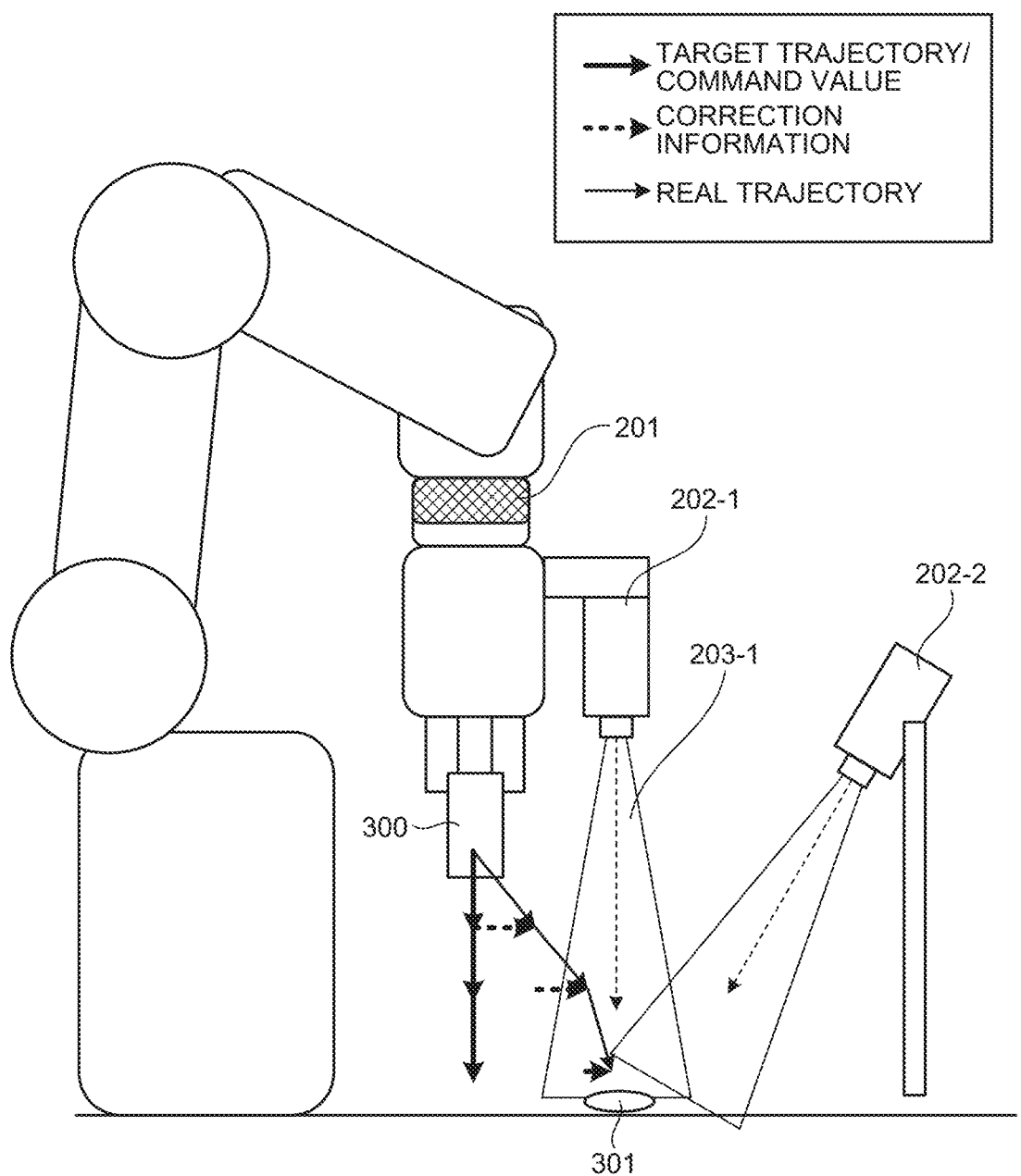
FIG. 10 is a diagram illustrating a specific example of the robot system to which the robot control device according to the first embodiment is applied.
Figure 11:
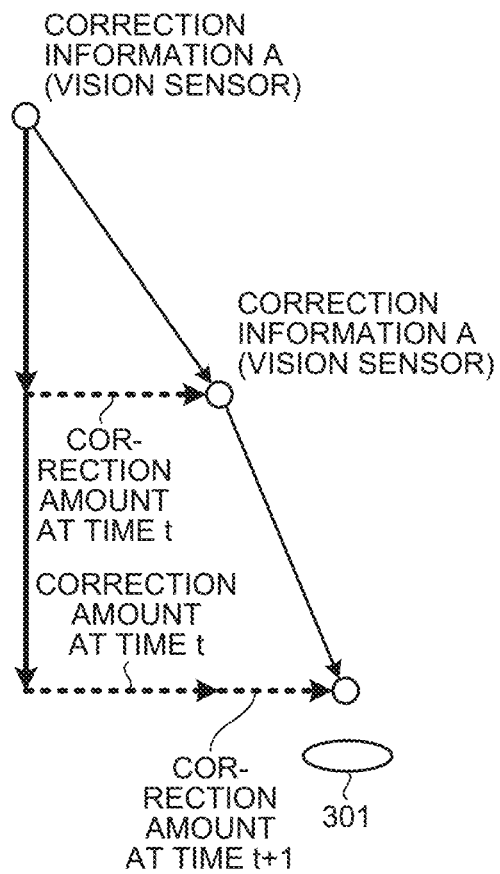
FIG. 11 is a diagram illustrating an example of a relationship among a target trajectory, a real trajectory, and correction information of a robot in the robot system illustrated in FIG. 10.

As an example, control of a robot having a configuration illustrated in FIG. 10 will be described. FIG. 10 is a diagram illustrating a specific example of a robot system to which the robot control device 1 according to the first embodiment is applied. The robot system illustrated in FIG. 10 includes a robot that performs an assembling operation, in which a force sensor 201 and vision sensors 202-1 and 202-2 are installed as external sensors. In such a robot system, by way of example, the robot control device 1 controls the robot to move an object 300 that is a work target object gripped by an end effector, to a location 301. At this time, the vision sensor 202-1 installed in a main body of the robot captures an image of a range of a field of view 203-1, and outputs the captured result as a sensor signal. In this robot system, the robot control device 1 moves the end effector as illustrated in FIG. 11 on the basis of a target trajectory and correction information A calculated from the sensor signal outputted by the vision sensor 202-1. FIG. 11 is a diagram illustrating an example of a relationship among a target trajectory, a real trajectory, and correction information of the robot in the robot system illustrated in FIG. 10.

Figure 12:
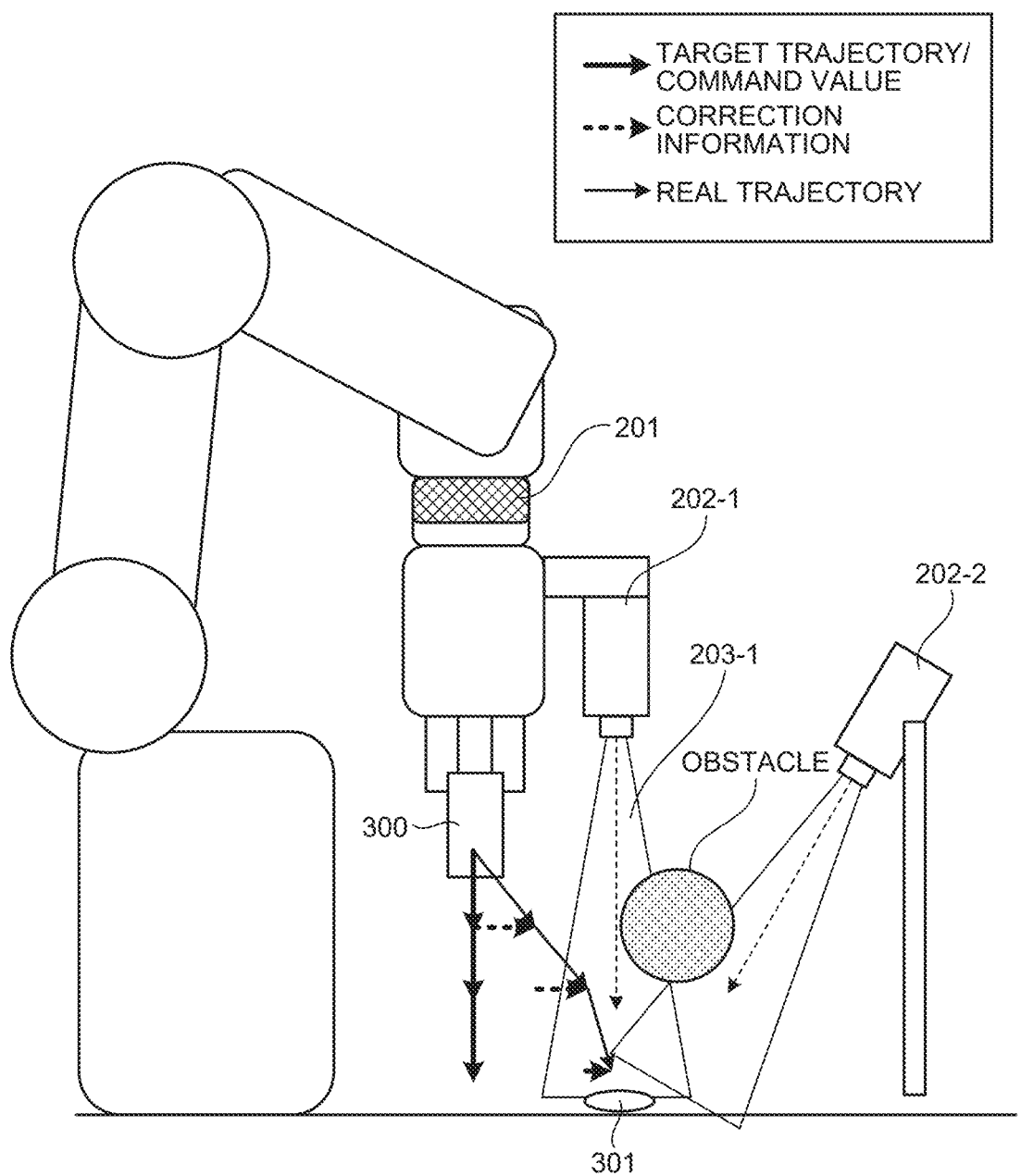
FIG. 12 is a diagram illustrating an example of an operation status of the robot system according to the first embodiment.
Figure 13:
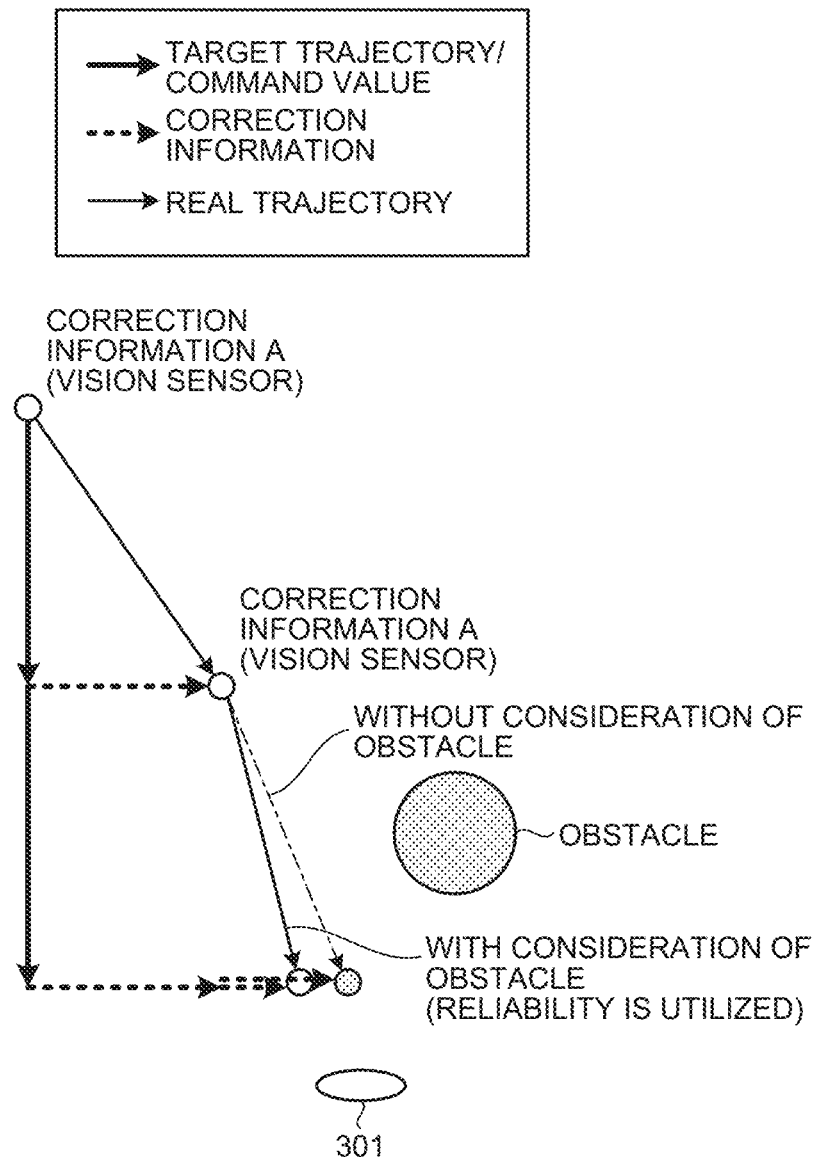
FIG. 13 is a diagram illustrating an example of a relationship among a target trajectory, a real trajectory, and correction information of the robot in the operation status illustrated in FIG. 12.

In this situation, in a case where a foreign object, a person, or the like as an obstacle enters an environment as illustrated in FIG. 12, the robot control device 1 detects the obstacle on the basis of the reliability Pc of the feature quantity Vk and takes an action according to the situation. For example, in a case of calculating the reliability as described with reference to FIG. 9, when the reliability of a certain point is lower than the reliability of the surroundings thereof, the robot control device 1 controls the robot so as to avoid a point having the low reliability. For example, the robot control device 1 performs control on the robot 2, such as correcting a trajectory of the end effector, changing a movement speed thereof, and temporarily stopping movement thereof. A relationship between a target trajectory and an actual trajectory (a real trajectory) of the end effector at this time is as illustrated in FIG. 13. As a result, the robot system 100 can be prevented from being damaged due to collision of the robot 2 and the object 300 with an obstacle or some trouble like that. In addition, since damage to the robot system 100 can be prevented, a situation in which an assembling line is forced to stop for a long time can be avoided, and reduction of a stop time of the line can be achieved.

Figure 14:
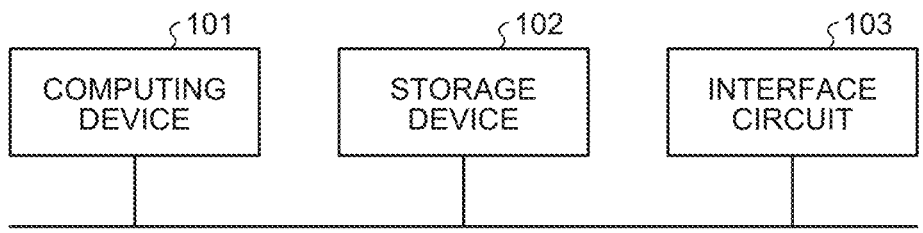
FIG. 14 is a diagram illustrating an example of hardware by which the robot control device is implemented.

Here, a hardware configuration of the robot control device 1 according to the first embodiment will be described. FIG. 14 is a diagram illustrating an example of hardware by which the robot control device 1 is implemented.

The robot control device 1 can be implemented by, for example, a computing device 101, a storage device 102, and an interface circuit 103 illustrated in FIG. 14. Examples of the computing device 101 include a central processing unit (CPU) (also referred to as a central processing device, a processing device, an arithmetic device, a microprocessor, a microcomputer, a digital signal processor (DSP)) and a system large scale integration (LSI) circuit. Examples of the storage device 102 include a random access memory (RAM), a read only memory (ROM), a hard disk drive, a solid state drive (SSD), a removable memory device, or a combination thereof.

The reliability computing unit 11, the correction command value computing unit 12, and the command value generation unit 13 of the robot control device 1 are implemented by the computing device 101 executing a program configured to carry out operations for these units. The program for carrying out the operations for the reliability computing unit 11, the correction command value computing unit 12, and the command value generation unit 13 is stored in advance in the storage device 102. The computing device 101 operates as the reliability computing unit 11, the correction command value computing unit 12, and the command value generation unit 13 by reading out the program described above from the storage device 102 and executing the program. Further, the target trajectory holding unit 14 is implemented by the storage device 102.

The storage device 102 holds the program described above, and is also used as a temporary memory when the computing device 101 executes various kinds of processes. The interface circuit 103 is used when the robot control device 1 transmits data to and receives data from the robot 2 and the sensor controller 4.

Note that the program described above for realizing operations for the individual units of the robot control device 1 is stored in the storage device 102 in advance, but is not necessarily limited to this example. The program described above may have a form of being supplied to the user in a state of being written in a recording medium such as a compact disc (CD)-ROM or a digital versatile disc (DVD)-ROM, and installed in the storage device 102 by the user. Furthermore, the program described above may have a form of being provided to the user via a network such as the Internet. Although an example of hardware for implementing the robot control device 1 has been described, each robot control device described in a second and subsequent embodiments described later can be implemented by similar hardware.

Second Embodiment

Next, a robot control device according to the second embodiment will be described. A configuration of the robot control device according to the second embodiment is similar to that of the first embodiment (see FIG. 2). In the present embodiment, portions different from those in the first embodiment will be described.

The robot control device 1 according to the second embodiment is different from that in the first embodiment in that the reliability computing unit 11 described in the first embodiment calculates a reliability using two or more feature quantities 1005 (Vk, Vk+1, . . . ) obtained from sensor signals of two or more external sensors 3.

When a reliability Pc(k) calculated for a feature quantity Vk of a sensor signal Sk outputted by a certain external sensor SENk becomes a value smaller than 1 due to a sudden change in the feature quantity Vk, the reliability computing unit 11 according to the second embodiment checks a feature quantity Vk+1 for another external sensor SENk+1, and when the feature quantity Vk+1 also tends to decrease at the same time, the unit 11 makes treatment with regarding the actual change as currently occurring. That is, the reliability computing unit 11 determines that the reliability Pc(k) of the feature quantity Vk itself is not low, and corrects the reliability Pc(k) to have a large value on the basis of the feature quantity Vk+1 or a reliability Pc (k+1). This processing is expressed by the following Equations (9) and (10). In Equation (9), Kw is a weight coefficient, and setting is made such that, as Kw is smaller, the reliability Pc is made closer to 1 when a value of a feature quantity of a sensor signal from another external sensor SENk+1 is closer.

$$Pc(k)=Pc(k)+(1-Pc(k))/\{1+Kw \cdot ABS(Pc(k)-Pc(k+1))\}$$
$$\text{When } \{Pc(k)-Pc(k+1)\} \leq \Delta Pc\_th \quad (9)$$

$$Pc(k)=Pc(k) \text{ When } \{Pc(k)-Pc(k+1)\} > \Delta Pc\_th \quad (10)$$

In addition, in a case where two or more types of different external sensors 3 are used, regarding computation of a trajectory correction amount for the sensor signal Sk, performed by the correction command value computing unit 12, it is contemplated that the correction command value computing unit 12 has a configuration to make the weight coefficient wk of the correction amount ΔXck for the sensor signal Sk smaller when the reliability Pc (k+1) for a sensor signal Sk+1 outputted by an external sensor SENk of another type is significantly high and a significant correction amount ΔXck+1 is outputted. However, wk is defined by |wk|<1, and the trajectory correction amount ΔXd can be defined as in the following Equations (11) to (13).

$$\Delta Xd = \Sigma(Ck \cdot wk \cdot \Delta Xck) \quad (11)$$

$$Ck = fnc(Pc(k)) \quad (12)$$

$$wk = fnc(Pc(k+1), Xck+1) \quad (13)$$

For processing of the correction command value computing unit 12 in line with this, the following case may be specifically considered. For example, in a robot system as illustrated in FIG. 12, a vision sensor SENk (the vision sensor 202-1) and a force sensor SENk+1 (the force sensor 201) that acquires force information regarding contact of the object 300 such as an end effector of a robot or a workpiece with a surrounding environment are mounted, and the robot 2 performs a task of performing assembly work. A case will be considered in which the correction command value computing unit 12 calculates a trajectory correction amount for the vision sensor SENk under the above condition. The correction command value computing unit 12 can automatically adjust the weight coefficient wk on the basis of the sensor signal Sk+1 outputted by the force sensor SENk+1, as an index independent of the correction coefficient Ck based on the reliability of the sensor signal Sk outputted by the vision sensor SENk. For example, when a value of the sensor signal Sk+1 outputted by the force sensor SENk+1 is larger than a predetermined threshold value, a contact state is affirmed, and the weight coefficient wk is set to a value considerably smaller than 1. On the other hand, when the value of the sensor signal Sk+1 outputted by the force sensor SENk+1 is equal to or less than the predetermined threshold value and the contact state is not affirmed (that is, when Xck+1 is substantially 0), the weight coefficient wk is set to substantially 1. This adjustment is effective in a case where the end effector and an obstacle or the like are in a contact state, and the contact state deteriorates when trajectory correction is performed in accordance with a correction amount (a location correction amount) computed based on the sensor signal outputted by the vision sensor.

According to the above configuration, in the robot control device 1 that generates a correction command value in the robot system 100 including a plurality of external sensors 3, the number of which is two or more, the reliability Pc(k) can be corrected using the reliability 1006 (the reliability Pc (k+1)) or the correction information 1003 for another external sensor 3 other than a certain external sensor 3, in particular. This makes it possible to detect an irregular state such as mixing of a foreign object or entry of a person separately from a failure of the sensor, and continue the operation and detect an anomalous state early. As a result, special effects can be obtained such as shortening of a stop time and improvement of production efficiency in the production system.

Third Embodiment

Figure 15:
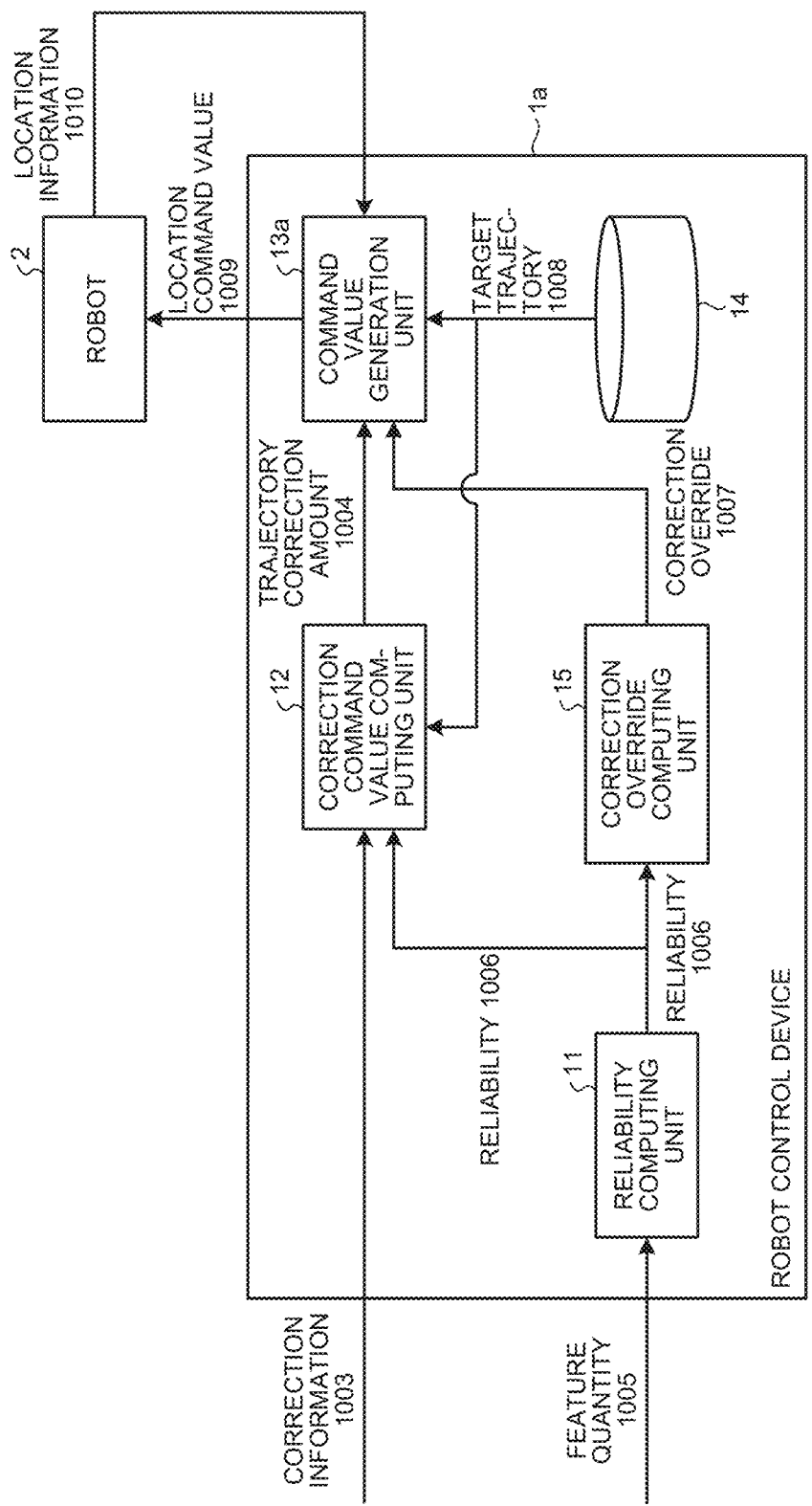
FIG. 15 is a diagram illustrating a configuration example of a robot control device according to a third embodiment.

FIG. 15 is a diagram illustrating a configuration example of a robot control device 1a according to a third embodiment. The robot control device 1a has a configuration in which a correction override computing unit 15 is further added to the robot control device 1 according to the first embodiment, and the command value generation unit 13 is replaced with a command value generation unit 13a. In FIG. 15, identical components to those of the robot control device 1 according to the first embodiment are denoted by the same reference symbols. In the present embodiment, portions different from those in the first embodiment will be described.

The correction override computing unit 15 generates a correction override by correcting an override value that is a speed index for proceeding on the target trajectory, on the basis of the reliability 1006 calculated by the reliability computing unit 11. The correction override computing unit 15 computes a correction override 1007 such that the correction override becomes lower as the reliability 1006 is lower, and outputs the correction override 1007 to the command value generation unit 13a. The command value generation unit 13a generates the location command value 1009 on the basis of the trajectory correction amount 1004, the target trajectory 1008, the location information 1010 based on a measurement result obtained by the internal sensor of the robot 2, and the correction override 1007.

Figure 16:
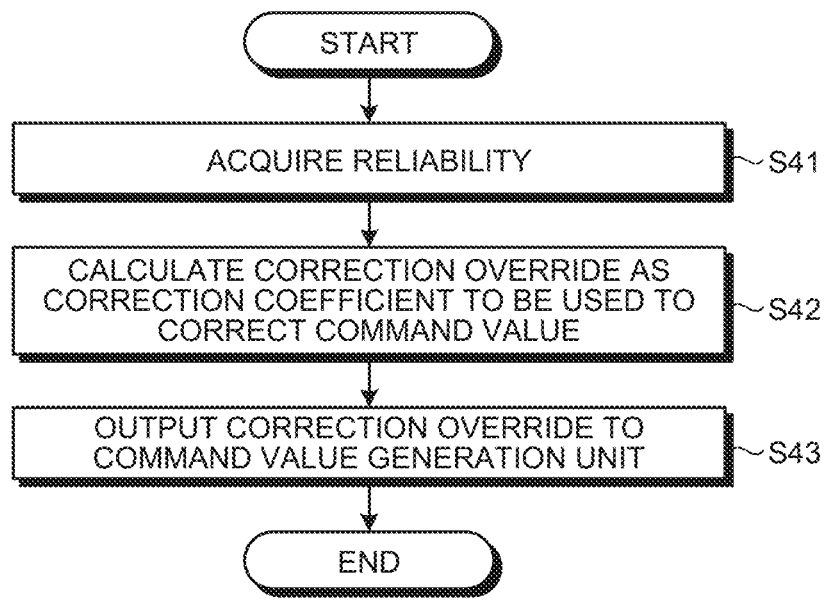
FIG. 16 is a flowchart illustrating an example of an operation of a correction override computing unit of the robot control device according to the third embodiment.

FIG. 16 is a flowchart illustrating an example of an operation of the correction override computing unit 15 of the robot control device 1a according to the third embodiment.

As illustrated in FIG. 16, the correction override computing unit 15 acquires the reliability 1006 outputted from the reliability computing unit 11 (step S41), and calculates a correction override as a correction coefficient to be used to correct a command value, on the basis of the reliability 1006

(step S42). Then, the correction override computing unit 15 outputs the calculated correction override 1007 to the command value generation unit 13a (step S43).

Here, the correction override can be defined by, for example, 0 to 100%. In this case, the robot 2 stops proceeding when the correction override is 0%, and the robot 2 operates at a designed speed on the target trajectory when the correction override is 100%. Note that, in the following description, the correction override may be referred to as OvrdC. In addition, in the following description, the correction override OvrdC is assumed to basically take a real number in a range of 0 to 1 with 1.0 being set as an initial value. The correction override computing unit 15 computes a plurality of correction overrides OvrdC(k) for their respective sensors.

Figure 17:
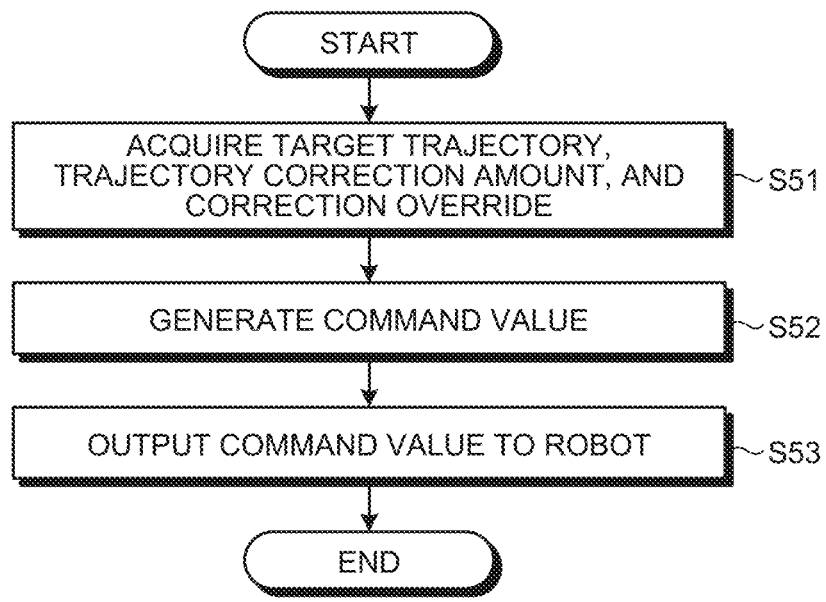
FIG. 17 is a flowchart illustrating an example of an operation of a command value generation unit of the robot control device according to the third embodiment.

FIG. 17 is a flowchart illustrating an example of an operation of the command value generation unit 13a of the robot control device 1a according to the third embodiment.

As illustrated in FIG. 17, the command value generation unit 13a acquires the target trajectory 1008 (Xd) outputted from the target trajectory holding unit 14, the trajectory correction amount 1004 ($\Delta$Xd) outputted from the correction command value computing unit 12, and the correction override 1007 (OvrdC) outputted from the correction override computing unit 15 (step S51), and generates a command value on the basis of the target trajectory 1008, the trajectory correction amount 1004, and the correction override 1007 (step S52). The command value generation unit 13a outputs the generated command value to the robot 2 (step S53).

In step S52, the command value generation unit 13a performs processing equivalent to change of speed and generates the command value by correcting the inputted target trajectory Xd or an execution amount of the trajectory correction amount $\Delta$Xd on the basis of the correction override OvrdC (0 to 1). For example, when the correction override OvrdC decreases with decrease in the reliability Pc, an effect is exerted in a direction of reducing a movement speed of a robot hand tip.

Figure 18:
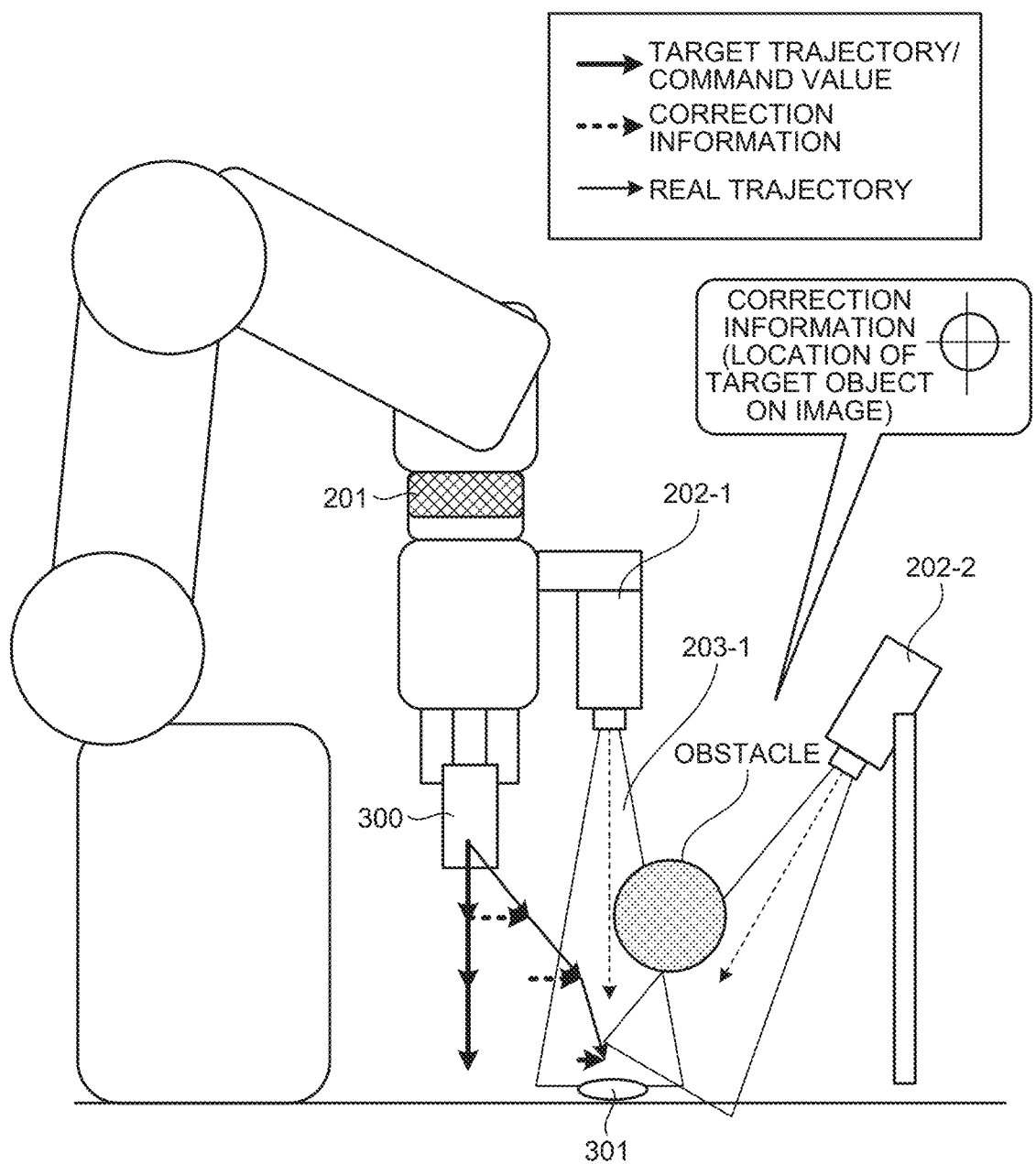
FIG. 18 is a diagram for explaining an operation of a robot system according to the third embodiment.
Figure 19:
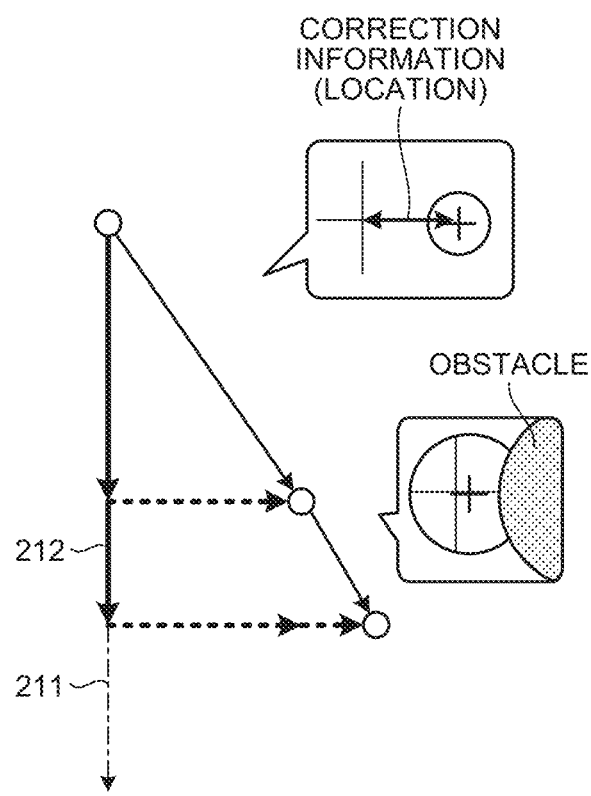
FIG. 19 is a diagram illustrating an example of a relationship among a target trajectory, a real trajectory, and correction information of a robot in the operation status illustrated in FIG. 18.

For example, consider a case example as illustrated in FIG. 18, that is, a case where there is an obstacle in the field of view 203-1 of the vision sensor 202-2 attached to the robot 2. In the case illustrated in FIG. 18, the reliability Pc acquired together with the correction information $\Delta$Xd by the command value generation unit 13a becomes a low value, and the correction override OvrdC decreases accordingly. As a result, as illustrated in FIG. 19, the robot 2 continues the operation with a reduced speed in accordance with a downward arrow 212 of a thick solid line, instead of proceeding along the target trajectory represented by a downward arrow 211 of a one-dot chain line that is a trajectory demonstrated in the case of no obstacle.

In a case where the target trajectory Xd given in advance is provided by a form of a point sequence of locations, the command value generation unit 13a converts the target trajectory Xd into a moving speed vd to a next target location for each control cycle at each point, and computes a target location Xdc after application of the correction override OvrdC, from a movement amount for one control cycle under a condition that the movement speed vd is reduced.

The correction override OvrdC to be calculated by the correction override computing unit 15 on the basis of the reliability 1006 can be defined as, for example, a minimum value among the reliabilities Pc(k) for the plurality of sensor signals Sk, as expressed in the following Equation (14).

$$OvrdC=\min(Pc(k)) \tag{14}$$

In another manner, there is a useful method in which the correction override computing unit 15 outputs a plurality of correction overrides OvrdC(k) for their respective sensor signals Sk, and the command value generation unit 13a selects a correction override OvrdC(k) corresponding to correction information $\Delta$Xck having the largest proportion in the trajectory correction amount $\Delta$Xd from among a plurality of pieces of correction information $\Delta$Xck for their respective sensor signals Sk, so as to accordingly generate the command value.

By adding the correction override computing unit 15 having the above configuration to the robot control device 1 according to the first embodiment to obtain the robot control device 1a, it becomes possible to detect an irregular state such as mixing of some foreign object and entry of a person during operation of the robot system 100 separately from a failure of the external sensor 3, and to continue the operation at a low speed or detect an anomalous state without collision. As a result, special effects can be obtained such as shortening of a stop time and improvement of production efficiency in the production system.

Fourth Embodiment

Figure 20:
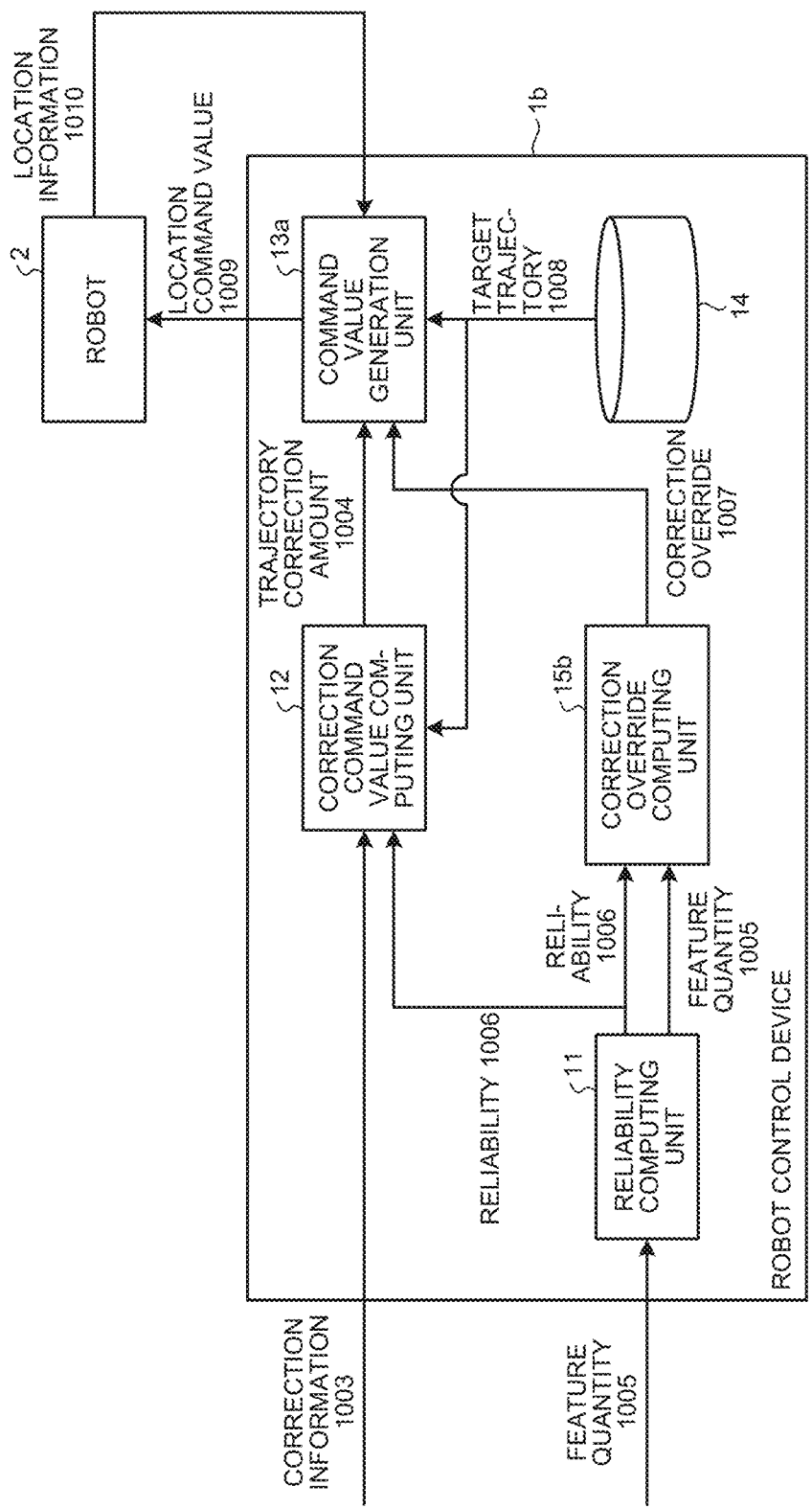
FIG. 20 is a diagram illustrating a configuration example of a robot control device according to a fourth embodiment.

FIG. 20 is a diagram illustrating a configuration example of a robot control device 1b according to a fourth embodiment. The robot control device 1b has a configuration in which the correction override computing unit 15 of the robot control device 1a according to the third embodiment is replaced with a correction override computing unit 15b. In FIG. 20, identical components to those of the robot control device 1a according to the third embodiment are denoted by the same reference symbols. In the present embodiment, portions different from those in the third embodiment will be described.

A difference between processing of the correction override computing unit 15 of the third embodiment and processing of the correction override computing unit 15b of the fourth embodiment is as follows. That is, when the correction override OvrdC(k) is computed, the correction override computing unit 15b computes the correction override OvrdC(k) as expressed in the following Equations (15) and (16) while using, as its inputs to the correction override computing unit 15b, the feature quantity 1005 (Vk+1) of the sensor signal Sk+1 of a second external sensor that is a different external sensor 3, in addition to the reliability 1006 (Pc(k)) of the sensor signal Sk of a first external sensor that is the external sensor 3 as a target. Specifically, the correction override computing unit 15b computes the correction override in accordance with the reliability Pc(k) when the feature quantity Vk+1 is equal to or less than a threshold value $\Delta$Vth, and outputs 0 without computing the correction override when the threshold value $\Delta$Vth is exceeded. The present embodiment is characterized in that equations are switched on the basis of whether or not the certain feature quantity Vk+1 exceeds the threshold value $\Delta$Vth, while a magnitude relationship of the threshold value $\Delta$Vth and a definition of a used function are not limited to the following.

$$OvrdC(k)=fnc(Pc(k)) \quad Vk+1 \leq \Delta Vth \tag{15}$$

$$OvrdC(k)=0 \quad Vk+1 > \Delta Vth \tag{16}$$

Figure 21:
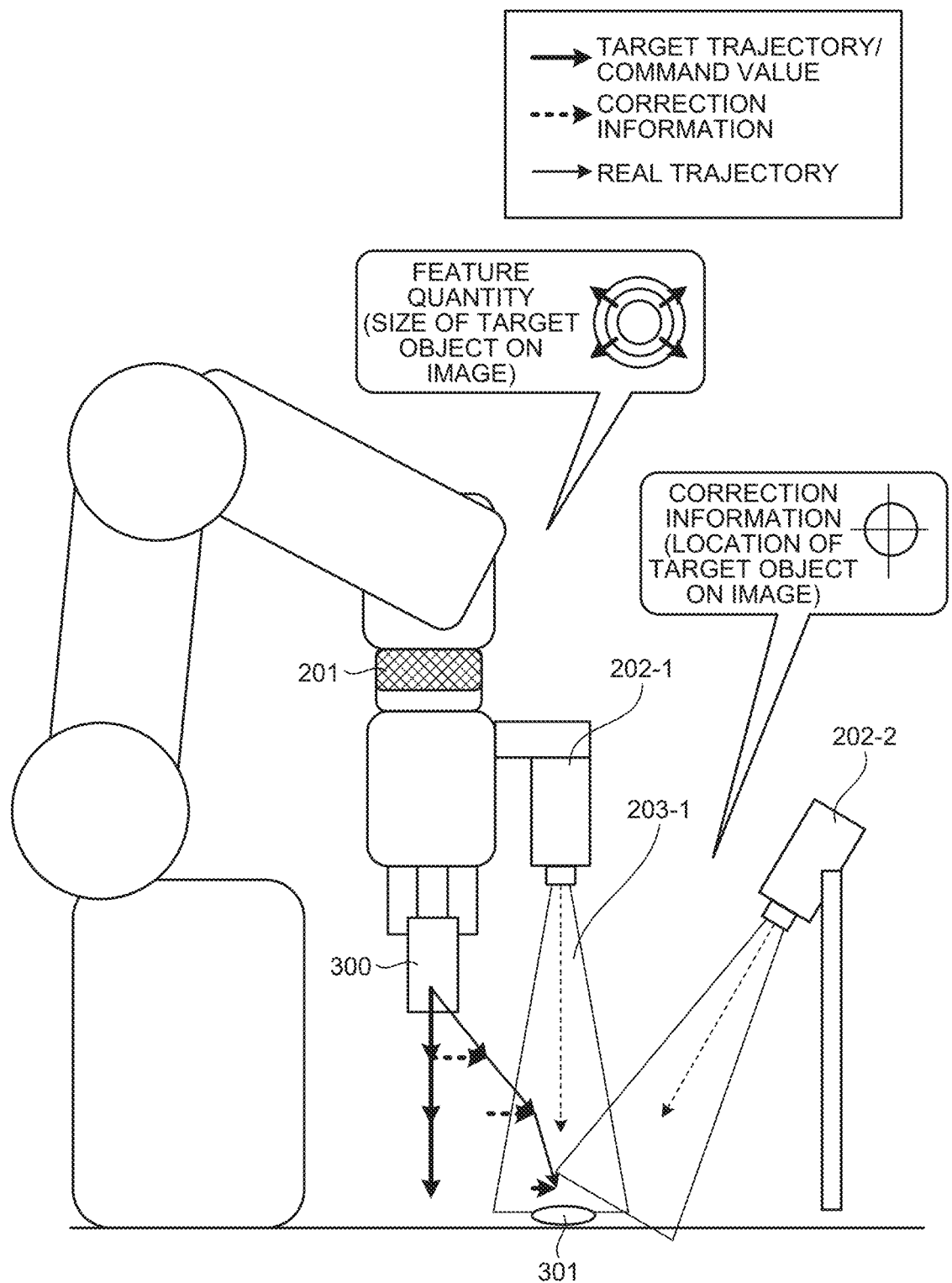
FIG. 21 is a diagram for explaining an actual operation of the robot control device according to the fourth embodiment.
Figure 22:
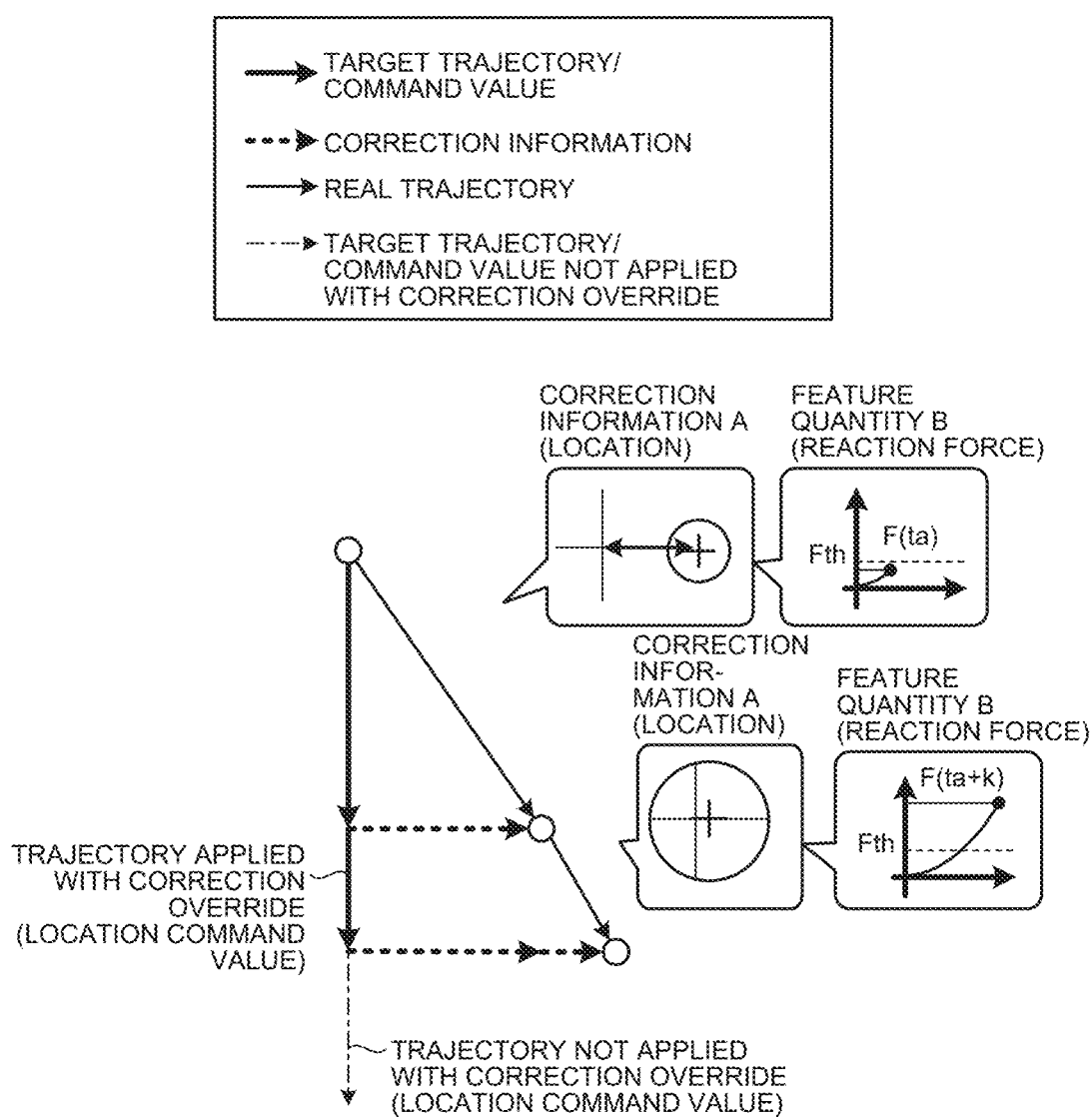
FIG. 22 is a diagram illustrating an example of a relationship among a target trajectory, a real trajectory, and correction information of a robot in the operation status illustrated in FIG. 21.

For example, consider integrating and utilizing information based on non-contact measurement by the vision sensors 202-1 and 202-2, a distance sensor (not illustrated), or the like, and information based on contact by the force sensor 201, a tactile sensor (not illustrated), or the like, in a robot system as illustrated in FIG. 21. The vision sensor 202-1 (hereinafter referred to as a vision sensor SENk) and the force sensor 201 (hereinafter, referred to as a force sensor SENk+1) that acquires force information regarding contact of an end effector of the robot 2 and a workpiece with a surrounding environment thereof are mounted to the robot, and the robot 2 performs a task of carrying out assembling work. In this situation, there is considered a case where a trajectory correction amount for the vision sensor SENk is calculated. In this case, as illustrated in FIG. 22, it is possible to automatically adjust a correction override OvrdC(k) (correction information A illustrated in the figure) for the vision sensor SENk on the basis of the feature quantity Vk+1 (a feature quantity B illustrated in the figure) of the sensor signal Sk+1 of the force sensor SENk+1 capable of measuring the force information, as an index independent of the correction coefficient Ck based on the reliability Pc(k) of the sensor signal Sk of the vision sensor SENk.

According to the present embodiment, it is possible to easily configure a system capable of automatically adjusting a speed by means of combination of the feature quantity Vk of the sensor signal Sk based on non-contact measurement and the feature quantity Vk+1 of the sensor signal Sk+1 based on measurement in which contact occurs, in a case where it is difficult to adjust an operation speed according to a work situation in the robot system 100 equipped with the plurality of external sensors 3. As a result, since the robot system that is less likely to cause system stop can be started up in a shorter time, it is possible to improve an operation rate and production efficiency of a factory related to product manufacturing.

Fifth Embodiment

Figure 23:
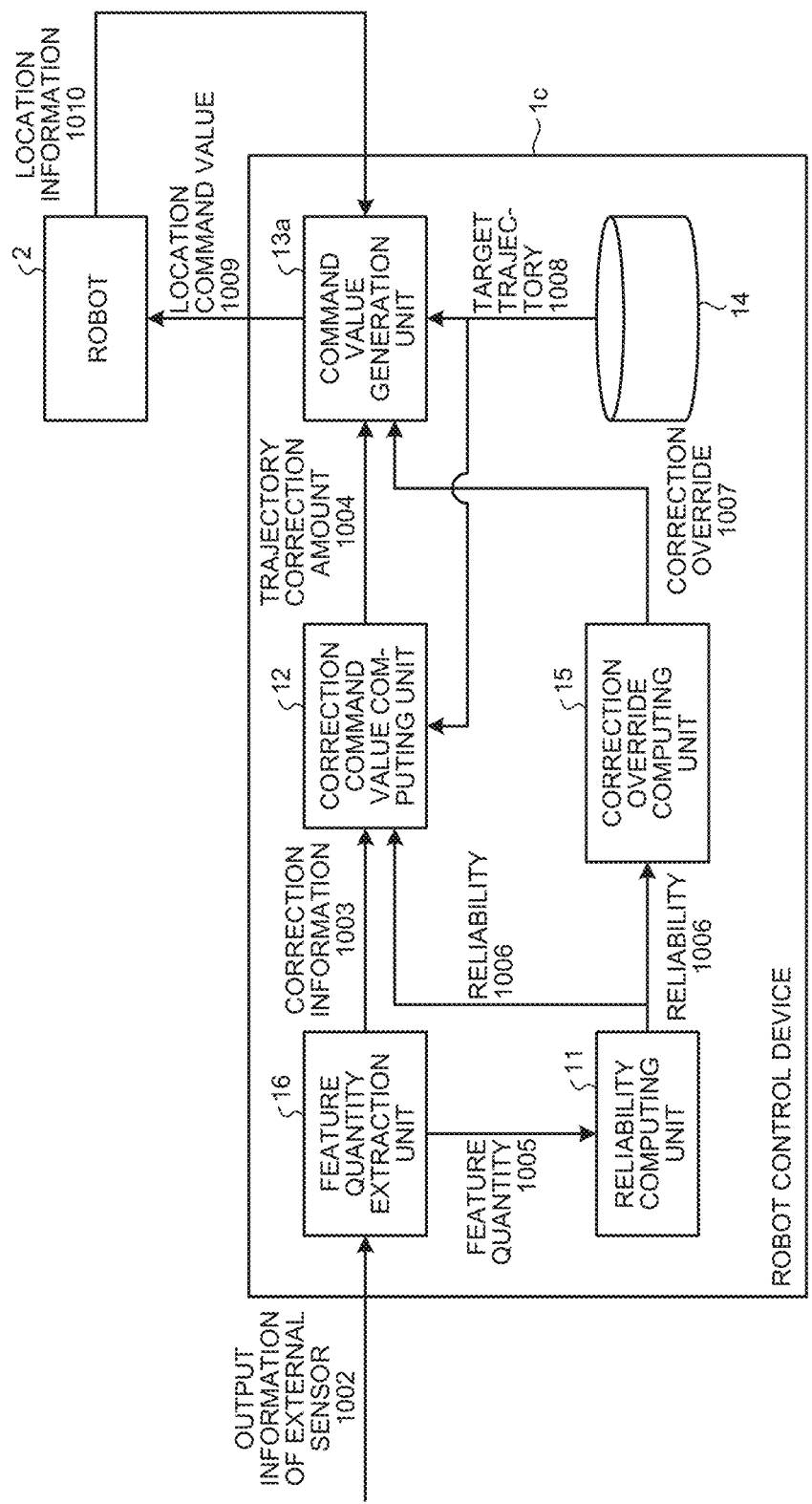
FIG. 23 is a diagram illustrating a configuration example of a robot control device according to a fifth embodiment.

FIG. 23 is a diagram illustrating a configuration example of a robot control device 1c according to a fifth embodiment. The robot control device 1c has a configuration in which a feature quantity extraction unit 16 is added to the robot control device 1a according to the third embodiment. In FIG. 23, identical components to those of the robot control device 1a according to the third embodiment are denoted by the same reference symbols. In the present embodiment, portions different from those in the third embodiment will be described.

Figure 24:
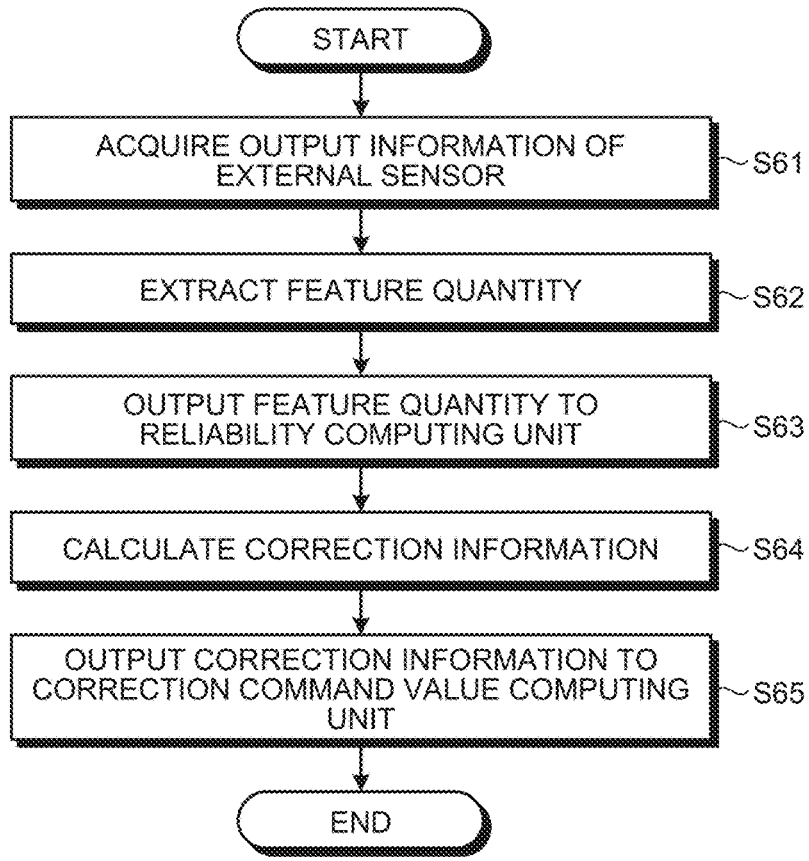
FIG. 24 is a flowchart illustrating an example of an operation of a feature quantity extraction unit of the robot control device according to the fifth embodiment.

FIG. 24 is a flowchart illustrating an example of an operation of the feature quantity extraction unit 16 of the robot control device 1c according to the fifth embodiment.

As illustrated in FIG. 24, the feature quantity extraction unit 16 acquires the output information 1002 of the external sensor 3 that is information indicating a measurement result obtained by the external sensor 3, from the sensor controller 4 (step S61), and extracts a feature quantity on the basis of the output information 1002 (step S62). The feature quantity extraction unit 16 outputs the extracted feature quantity 1005 to the reliability computing unit 11 (step S63).

Further, the feature quantity extraction unit 16 calculates correction information from the feature quantity extracted in step 962 (step S64), and outputs the calculated correction information 1003 to the correction command value computing unit 12 (step S65).

The correction information 1003 calculated by the feature quantity extraction unit 16 is not limited to information related to a location, and alternatively it may be information related to a speed, an acceleration, or a jerk. In the present embodiment, the correction information 1003 is calculated on the basis of the location information. The correction information 1003 calculated by the feature quantity extraction unit 16 can be, for example, a correction amount $\Delta Xck(T)$ expressed by Equation (5) described in the first embodiment.

In a case of such a configuration, the feature quantity extraction unit 16 can output M pieces of correction information and N feature quantities with respect to the output information 1002 of L external sensors 3 (L, M, and N are natural numbers of 2 or more).

For example, after performing processing of integrating sensor signals Sk and Sk+1 outputted by two sensors that are a distance sensor SENk and an RGB camera SENk+1 to identify a type of a work target object, the feature quantity extraction unit 16 can output a center location coordinates of the work target object as the second feature quantity Vk2 from the feature quantity Vk of an RGB image, on the basis of model information of the identified type.

Usually, such processing is often integrated as an application on the sensor controller 4 side. However, providing the feature quantity extraction unit 16 on the robot control device 1c side can lead to a configuration that is effective in a case where it is desired to output one piece as the feature quantity Vk or the second feature quantity Vk2 as a plurality of redundant sensor inputs.

This makes it possible to improve a likelihood of information on the feature quantity 1005 itself to be inputted to the reliability computing unit 11. As a result, the present embodiment can reduce a stop time of the system, and can achieve improvement of an operation rate and improvement of production efficiency in the production system.

Note that, in the present embodiment, the configuration has been described in which the feature quantity extraction unit 16 is added to the robot control device 1a according to the third embodiment, but a configuration can also be adopted in which the feature quantity extraction unit 16 is added to the robot control device 1 according to the first embodiment.

Sixth Embodiment

Next, a robot control device according to a sixth embodiment will be described. A configuration of the robot control device according to the sixth embodiment is similar to that of the first embodiment (see FIG. 2). In the present embodiment, portions different from those in the first embodiment will be described.

In the robot control device 1 according to the sixth embodiment, an operation for the command value generation unit 13 to generate a command value is different from that in the first embodiment.

Figure 25:
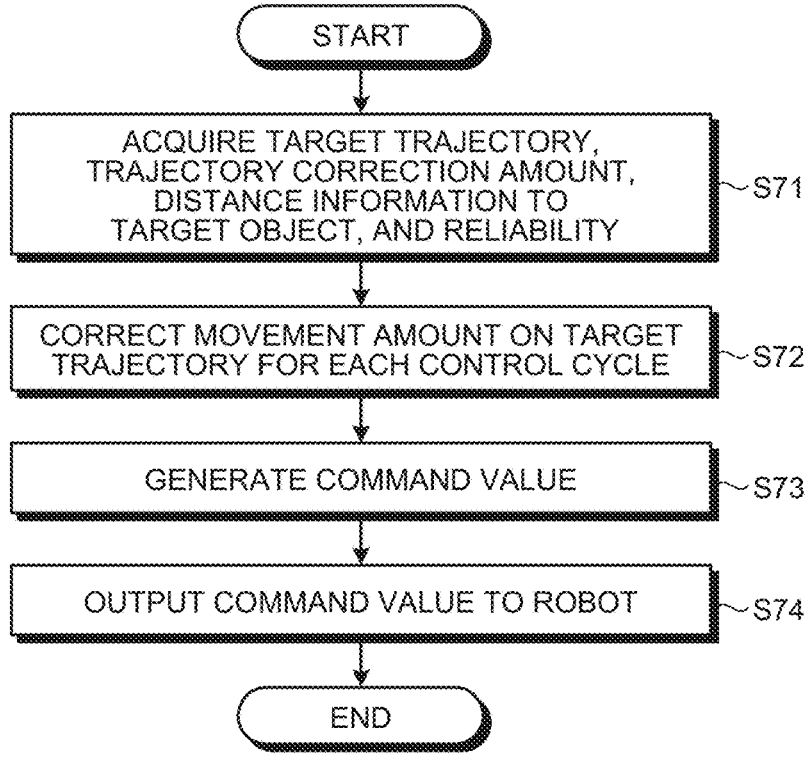
FIG. 25 is a flowchart illustrating an example of an operation of a command value generation unit of a robot control device according to a sixth embodiment.

FIG. 25 is a flowchart illustrating an example of an operation of the command value generation unit 13 of the robot control device 1 according to the sixth embodiment.

As illustrated in FIG. 25, the command value generation unit 13 according to the present embodiment acquires the target trajectory 1008 (Xd) outputted from the target trajectory holding unit 14, the trajectory correction amount 1004 ($\Delta Xd$) outputted from the correction command value computing unit 12, distance information measured by the external sensor 3 between a reference point of the robot 2 and a target object, and the reliability 1006 outputted from the reliability computing unit 11 (step S71). The reference point of the robot 2 is provided in the main body of the robot 2 or a surrounding environment thereof, and is situated within an imaging range of a vision sensor when the external sensor 3 is the vision sensor.

Next, the command value generation unit 13 corrects a movement amount on the target trajectory 1008 for each control cycle, on the basis of the trajectory correction amount 1004, the distance information between the reference point of the robot 2 and the target object, and the reliability 1006 (step S72).

Next, the command value generation unit 13 generates a command value on the basis of the corrected movement amount on the target trajectory 1008 for each control cycle (step S73), and outputs the generated command value to the robot 2 (step S74).

In the robot control device 1 according to the present embodiment, the process of computing the correction override 1007 described in the third embodiment, that is, the process of correcting an override value that is a speed index for proceeding on the target trajectory is performed by the command value generation unit 13. For that process, the command value generation unit 13 uses the distance information described above instead of the reliability Pc of the sensor signal Sk used by the correction override computing unit 15 described above.

Figure 26:
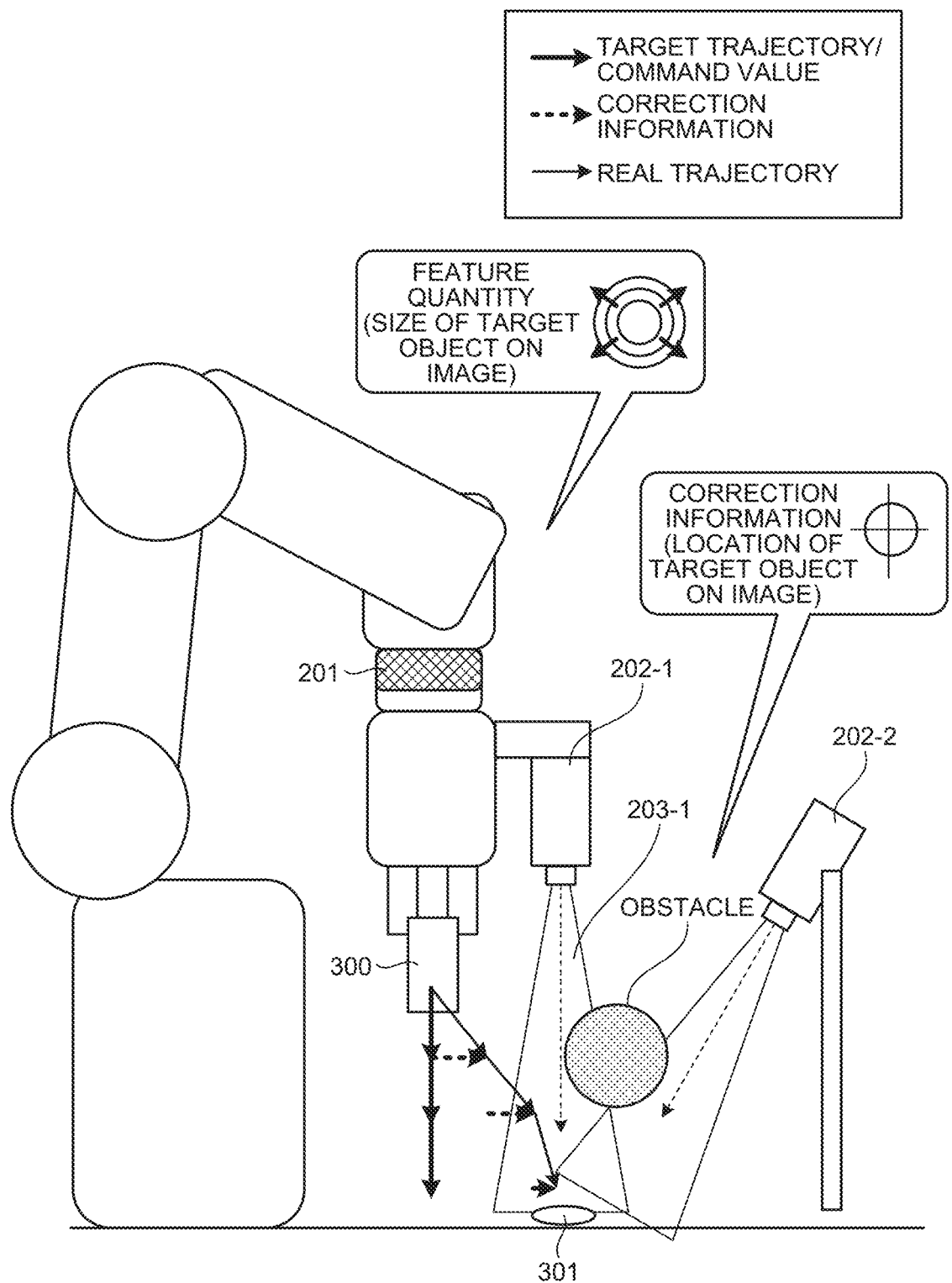
FIG. 26 is a diagram for explaining an operation of a robot system according to the sixth embodiment.
Figure 27:
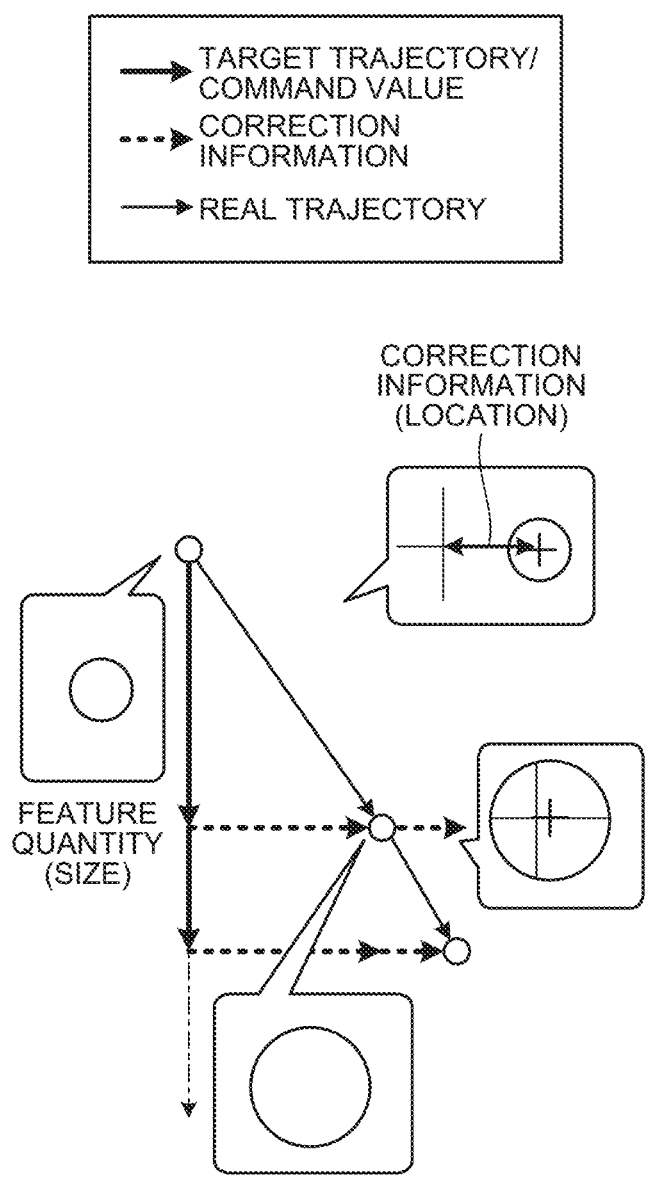
FIG. 27 is a diagram illustrating an example of a relationship among a target trajectory, a real trajectory, and correction information of a robot in the operation status illustrated in FIG. 26.

A specific example of correcting the override value using the distance information described above will be described. For example, in a case where the robot system 100 performs an assembling work of an industrial product as a task, a location of a robot hand tip where a component of the industrial product is taken out is to be the reference point described above, and a location of the robot hand tip in which a component is assembled is to be a target point of the robot 2 and is the target described above. Examples of a method of acquiring the distance information include a method of acquiring it through direct measurement using a laser displacement meter or the like, a method of estimating an approach state from a size of a target object on an image obtained as the second feature quantity to calculate the distance information by utilizing the vision sensor 202-1 as illustrated in FIGS. 26 and 27.

Figure 28:
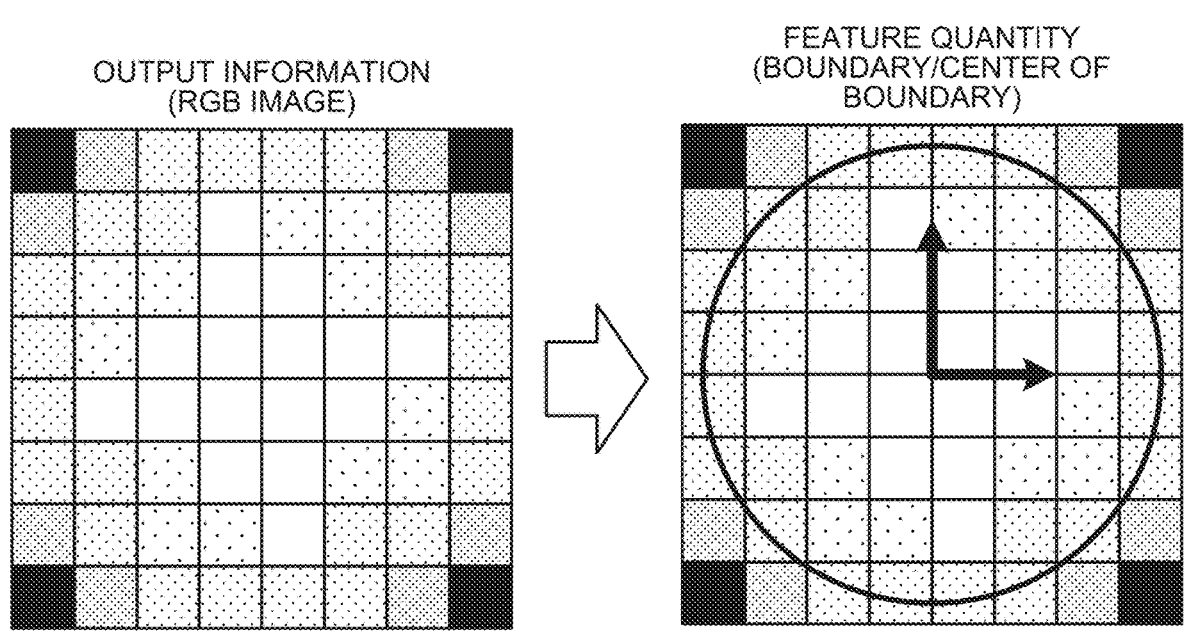
FIG. 28 is a diagram for explaining a feature quantity handled by the robot control device according to the sixth embodiment.

A method of calculating, from a size of the target object, a distance to the reference point of the robot as the second feature quantity with use of the vision sensor will be supplementarily described. First, FIG. 28 exemplifies a case example of extraction of a feature quantity based on image processing. FIG. 28 simulates a process of extracting a center and a radius of a circle as the feature quantity Vk from an RGB image when there is the RGB image.

Figure 29:
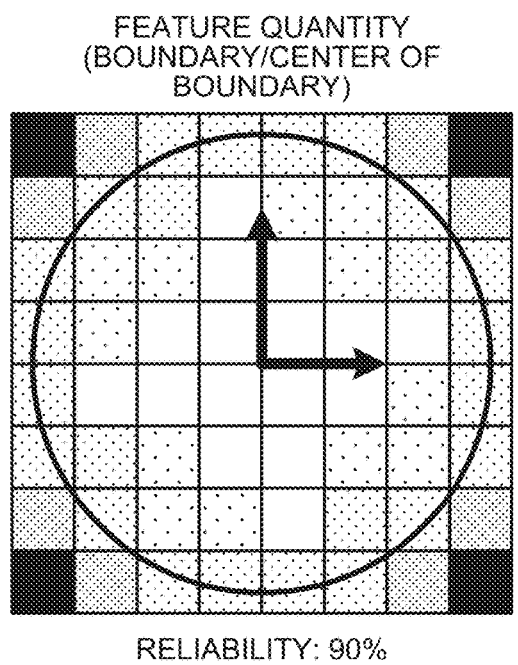
FIG. 29 is a diagram for explaining a method of extracting a second feature quantity from a feature quantity of an RGB image.
Figure 29:
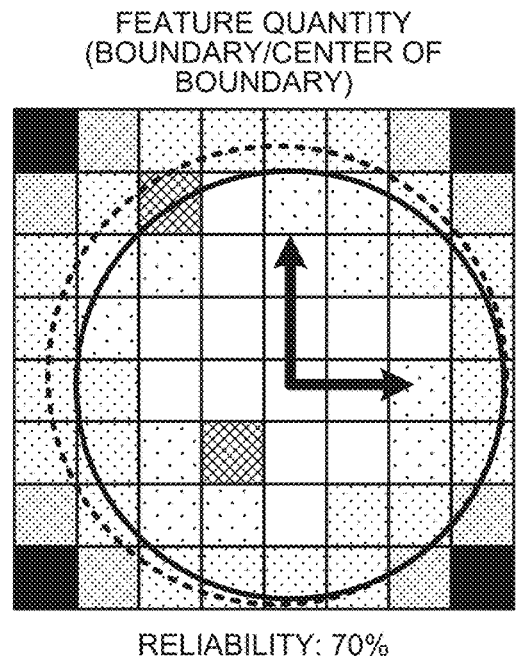
Figure 29:
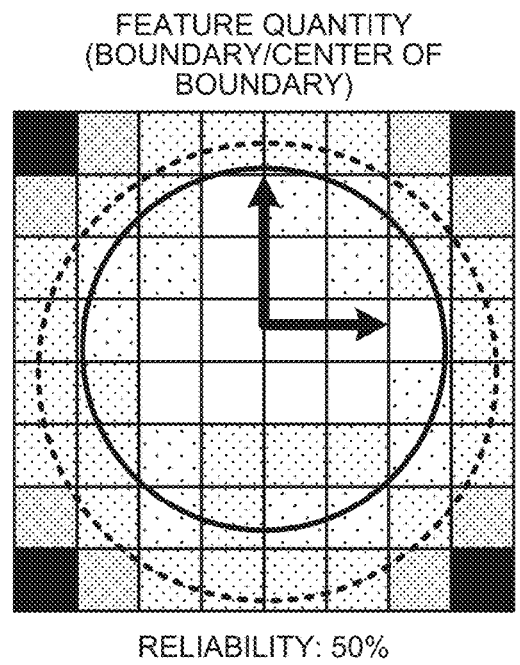

FIG. 29 is a diagram for explaining a method of extracting the second feature quantity Vk2 from the feature quantity of the RGB image.

FIG. 29 illustrates a state in which an outer shape of a circle, a center of the circle, and a radius Rk of the circle are extracted from the feature quantity Vk as the second feature quantity Vk2. In considering a time-series variation in the second feature quantity Vk2, an upper right subfigure of FIG. 29 illustrates a case where local noise suddenly appears, from which it can be seen that the reliability Pc(k) and the second feature quantity Vk2 that is information on the center and radius of the circle are changed. Further, a lower right subfigure of FIG. 29 illustrates a case where color of a lower right portion of the image suddenly changes, or specifically, a case where an image of a foreign object has been captured. In the latter case, since the temporal change of the color is rapid, the reliability Pc temporarily decreases.

Next, an actual method will be described in which the command value generation unit 13 according to the present embodiment generates a command value. First, in a case where the radius Rk of an approximate circle of a target object based on the second feature quantity Vk2 has become large, the command value generation unit 13 can define an approach distance Lc as in the following Equation (17), where the radius of the approximate circle is Rdk and the distance is Ld according to visibility at the target point. Note that Kr is an appropriate constant.

$$Lc = Ld \cdot \{1 - Kr \cdot (Rk - Rdk)\} \quad (17)$$

In this condition, the command value generation unit 13 corrects and reduces an execution amount by applying a process similar to that in the case of reducing the correction override described in the third embodiment, as the reliability Pc is smaller or when the approach distance Lc falls below an approach threshold value Lth. This process of correcting and reducing the execution amount corresponds to a process of converting the target trajectory into a speed waveform and reducing a linear speed along the trajectory at a certain rate without changing the trajectory. The command value generation unit 13 converts a speed pattern into a location command value on the basis of the trajectory in this case.

With the above configuration, the operation speed is defined on the basis of the approach distance Lc to the target object and the reliability Pc(k) of the feature quantity Vk of the sensor signal outputted from the external sensor 3 measuring the approach distance Lc, so that the robot operation speed is automatically adjusted. As a result, a special effect can be achieved by which the number of adjustment steps for the time of startup of the robot system 100 is reduced.

Seventh Embodiment

Figure 30:
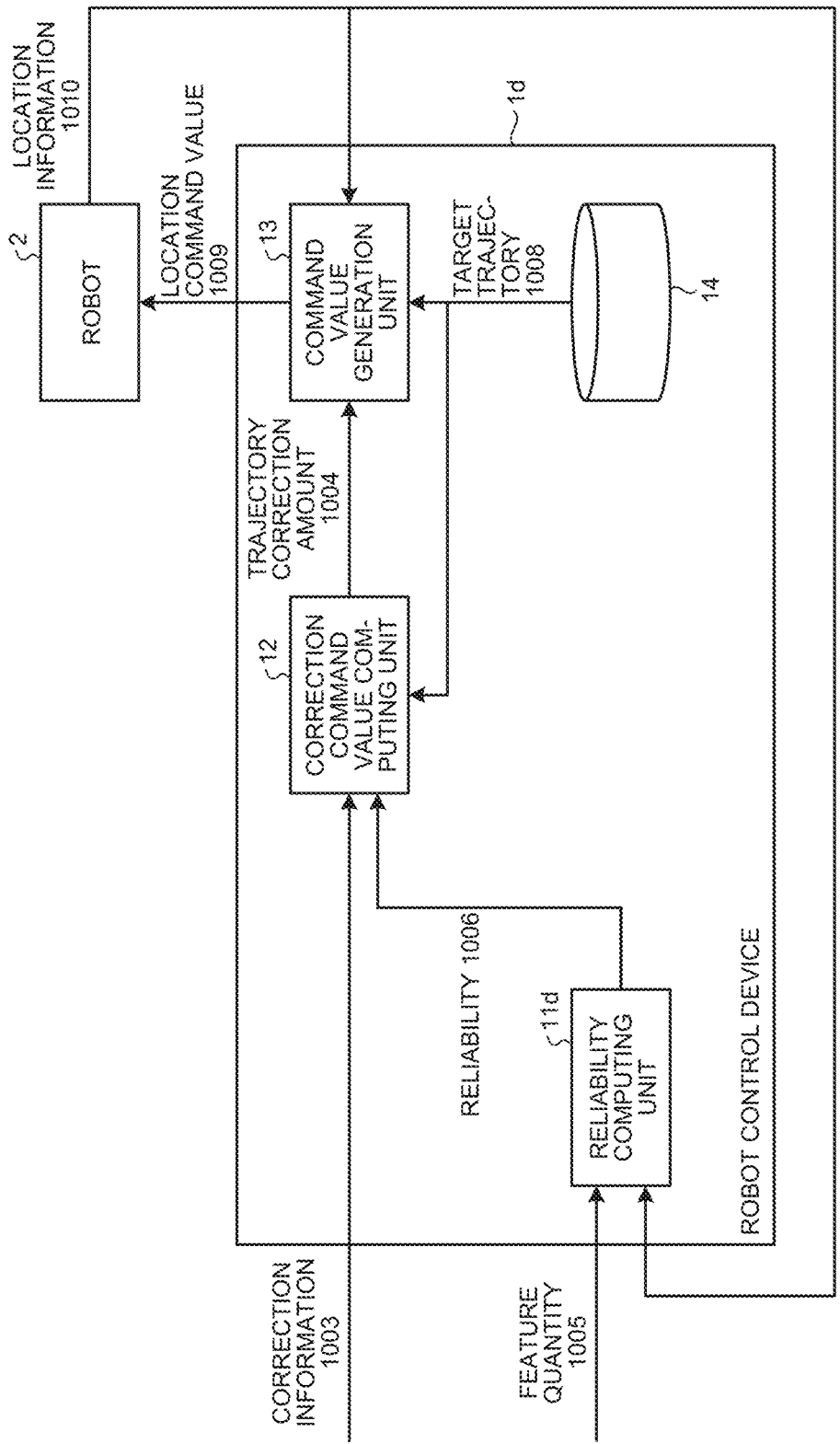
FIG. 30 is a diagram illustrating a configuration example of a robot control device according to a seventh embodiment.

FIG. 30 is a diagram illustrating a configuration example of a robot control device 1$d$ according to a seventh embodiment. The robot control device 1$d$ has a configuration in which the reliability computing unit 11 of the robot control device 1 according to the first embodiment is replaced with a reliability computing unit 11$d$. In FIG. 30, identical components to those of the robot control device 1 according to the first embodiment are denoted by the same reference symbols. In the present embodiment, portions different from those in the first embodiment will be described.

The reliability computing unit 11$d$ is inputted with the feature quantity 1005 and the location information 1010 of the robot 2. While the reliability Pc is an index based only on the feature quantity Vk, the reliability computing unit 11$d$ predicts that there is a possibility that the reliability of the feature quantity Vk(t) at the time t is significantly low, by predicting a change in the feature quantity Vk(t) on the basis of a history of the location information 1010 (Xa(t)) of the robot 2, and comparing a predicted value Vkp of the feature quantity with an actual feature quantity Vk.

A specific example therefor will be described. In the robot system 100 utilizing sensor feedback control using the external sensor 3, the robot control device 1$d$ is supposed to output the location command value 1009 to the robot 2 on the basis of an updated value of the trajectory correction amount 1004. In this condition, when the reliability computing unit 11$d$ acquires, as Xa(t), a history of location information on a robot hand tip location being moved, the reliability computing unit 11$d$ can use Xa(t) to predict, to some extent, a change in the feature quantity Vk obtained by the sensor signal Sk outputted by the external sensor 3 at the next moment, that is, a change expected in the feature quantity Vk obtained by the environmental change and a direction in which the change occurs.

Now an example of a change expected in the feature quantity Vk will be described. The correction information ΔXck calculated on the basis of the sensor feedback control must be outputted so that a difference between the feature quantity Vk and the target feature quantity Vdk is made smaller for a certain sensor signal Sk. Here, a history ΔVk of a feature quantity difference is defined as the following Equation (18).

$$\Delta Vk(t) = Vk(t) - Vdk(t) \tag{18}$$

In this consition, when the history ΔVk(t) of the feature quantity difference increases, the tendency is different from that expected, and for this reason the reliability computing unit 11d performs correction to reduce the reliability Pc and outputs the thus corrected reliability Pc to the correction command value computing unit 12.

Further, a case example of a direction in which the change occurs will be described. In a case where Xa(t) is proceeding in a specific direction, when a feature quantity component orthogonal to this axis is defined as Vk_crs and a history of a feature quantity difference in a direction orthogonal to the movement direction is defined as ΔVk_crs, ΔVk_crs must hardly change, intrinsically. For this reason, in a case where a change in the history ΔVk_crs of the feature quantity difference in the direction orthogonal to the moving direction is larger than a certain threshold value ΔVk_th, there is a significantly high possibility that an unexpected event has occurred, and so the reliability Pc can be made small. That is, when the change in the history ΔVk_crs of the feature quantity difference is larger than the threshold value ΔVk_th, the reliability computing unit 11d corrects the reliability Pc to be a smaller value and outputs the resultant value to the correction command value computing unit 12.

As described above, in a case where the robot 2 operates on the basis of sensor feedback of the external sensor 3, there are expected change and direction in change of the feature quantity Vk. The reliability computing unit 11d obtains the expected quantity and direction in change of the feature quantity Vk on the basis of a history Xa of a hand tip location of the robot 2, and corrects the reliability Pc on the basis of a comparison result with the actual feature quantity Vk to thereby improve a likelihood of the reliability Pc. As a result, an effect of improving the operation rate and the production efficiency of the system can be achieved.

Note that, in the present embodiment, the configuration has been described in which the reliability computing unit 11 of the robot control device 1 according to the first embodiment is replaced with the reliability computing unit 11d. However, a configuration may also be adopted in which the reliability computing unit 11 of the robot control device 1a according to the third embodiment, the reliability computing unit 11 of the robot control device 1b according to the fourth embodiment, or the reliability computing unit 11 of the robot control device 1c according to the fifth embodiment is replaced with the reliability computing unit 11d.

Eighth Embodiment

Figure 31:
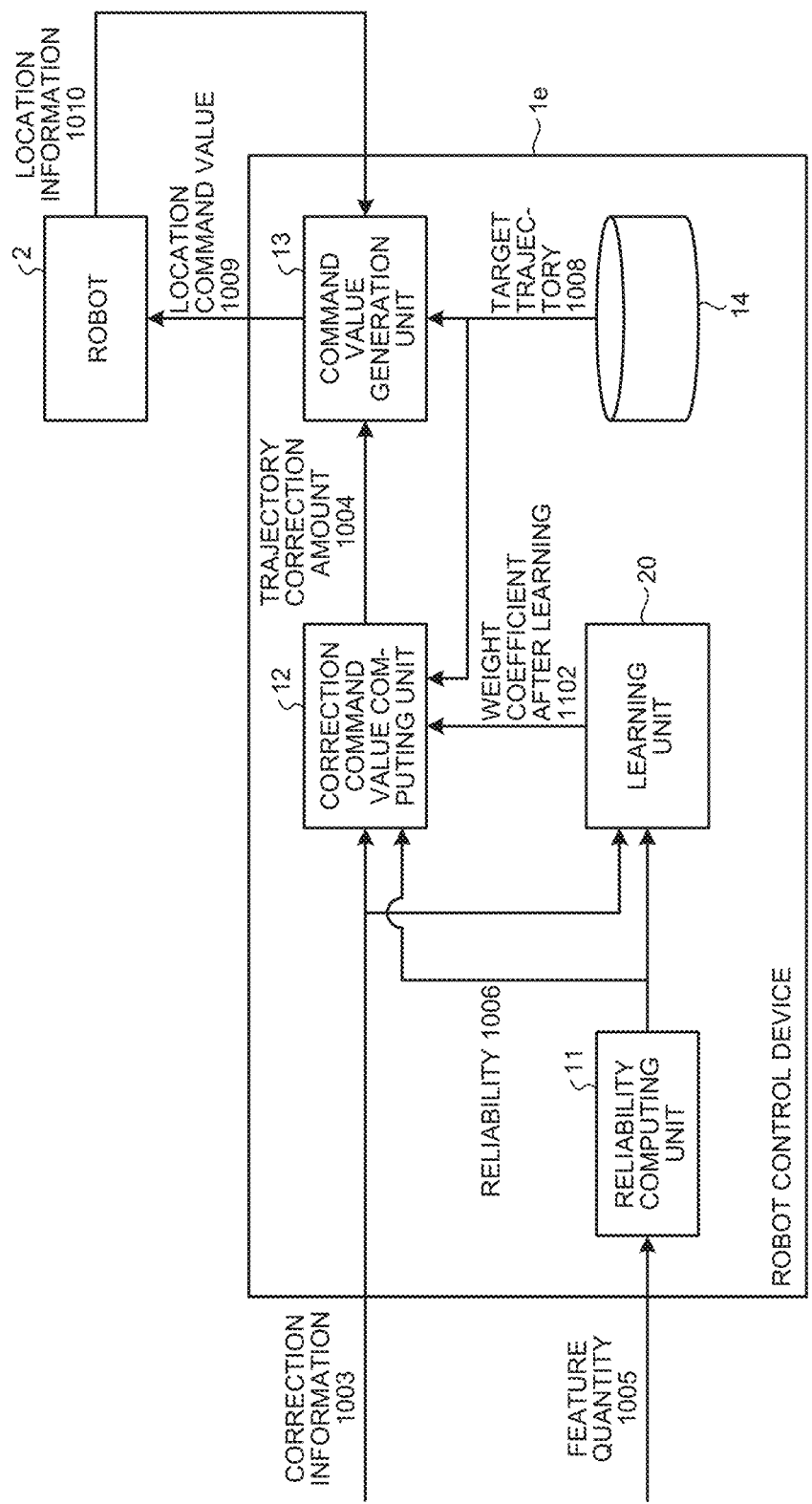
FIG. 31 is a diagram illustrating a configuration example of a robot control device according to an eighth embodiment.

FIG. 31 is a diagram illustrating a configuration example of a robot control device 1e according to an eighth embodiment. The robot control device 1e has a configuration in which a learning unit 20 is added to the robot control device 1 (see FIG. 2) according to the first embodiment. In FIG. 31, identical components to those of the robot control device 1 according to the first embodiment are denoted by the same reference symbols. In the present embodiment, portions different from those in the first embodiment will be described.

Figure 32:
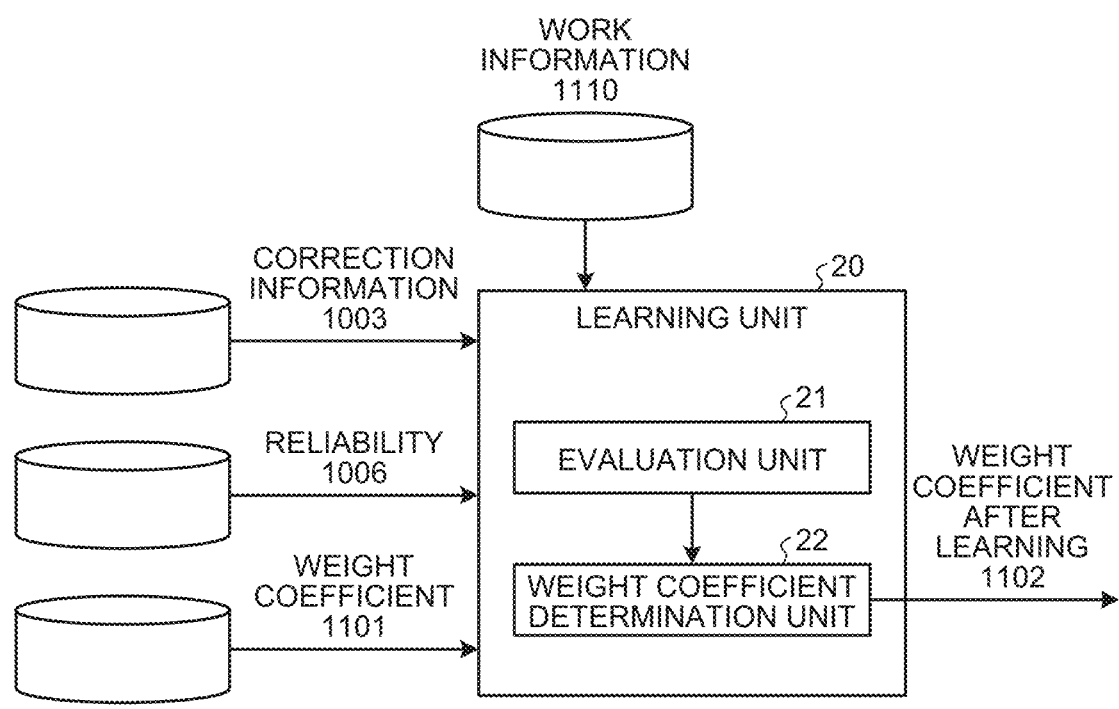
FIG. 32 is a diagram illustrating a configuration example of a learning unit of the robot control device according to the eighth embodiment.

FIG. 32 is a diagram illustrating a configuration example of the learning unit 20 of the robot control device 1e according to the eighth embodiment. The learning unit 20 includes an evaluation unit 21 and a weight coefficient determination unit 22. The correction information 1003 (ΔXck) for each external sensor SENk, the reliability 1006 (Pc(k)), a weight coefficient 1101, and work information 1110 are inputted to the learning unit 20. The work information 1110 means work result information indicating a result of causing the robot system 100 to attempt a work or a result of a work simulated by simulation, and includes work success/failure and work time. The weight coefficient 1101 is a weight coefficient constituting a function of outputting the trajectory correction amount 1004 in response to input of the correction information 1003 and the reliability 1006.

In the learning unit 20, machine learning is performed in which the evaluation unit 21 more highly evaluates the correction information 1003, the reliability 1006, and the weight coefficient 1101 when a work success rate is higher and the work time is shorter, on the basis of the work information 1110. That is, the evaluation unit 21 learns a combination of the correction information 1003, the reliability 1006, and the weight coefficient 1101 such that a higher evaluation can be obtained. The weight coefficient determination unit 22 selects one set from a plurality of sets of weight coefficients more highly evaluated by the evaluation unit 21, and outputs the selected one set to the correction command value computing unit 12 as a learned weight coefficient 1102 after the learning. The correction command value computing unit 12 holds a learning result obtained by the learning unit 20, that is, the leaned weight coefficient 1102 having been subjected to the learning. When the correction information 1003 and the feature quantity 1005 are newly inputted, the correction command value computing unit 12 calculates the trajectory correction amount 1004 on the basis of the inputted correction information 1003 and feature quantity 1005 and the held learned weight coefficient 1102 after the learning.

Here, the weight coefficient is defined for representation by a relational formula in which the reliability Pc(k) and the correction information ΔXck are used as inputs to output the trajectory correction amount ΔXd. When this weight coefficient is defined as wck, the trajectory correction amount ΔXd is calculated according to the following Equation (19), for example. The weight coefficient wck is set as an appropriate function such as a polynomial using a reliability as a variable.

$$\Delta Xd = \Sigma(wck \cdot \Delta Xck) \tag{19}$$

It is generally difficult to analyze a causal relationship between such a weight coefficient and information such as a cycle time and work success/failure, but an appropriate weight coefficient can be automatically determined by acquiring a large amount of the work information 1110 by performing simulation or actual work and performing learning using machine learning.

Note that, although the description has been given for the present embodiment based on the assumption that the learning unit 20 is present inside the robot control device 1e, an alternative configuration may be adopted in which the learning unit 20 is present outside the robot control device 1e, for example, within a computer external thereto. In the latter case, after the machine learning is completed, the learning unit 20 sets the learned weight coefficient 1102 after the learning acquired by the machine learning, in the correction command value computing unit 12 of the robot control device 1e.

With the above-described configuration, a more effective weight coefficient wck can be determined with use of the machine learning, for the weight coefficient wck that is difficult to obtain for the reason that some relation nature is complicated. Therefore, adjustment can be achieved with a higher work success rate and a shorter work time. As a result, an advantageous effect is obtained by which the production efficiency of the production system can be achieved.

Note that, in the present embodiment, the configuration in which the learning unit 20 is added to the robot control device 1 according to the first embodiment has been described, but an alternative configuration may also be adopted in which the learning unit 20 is added to the robot control device described in each of the second to seventh embodiments.

Ninth Embodiment

Figure 33:
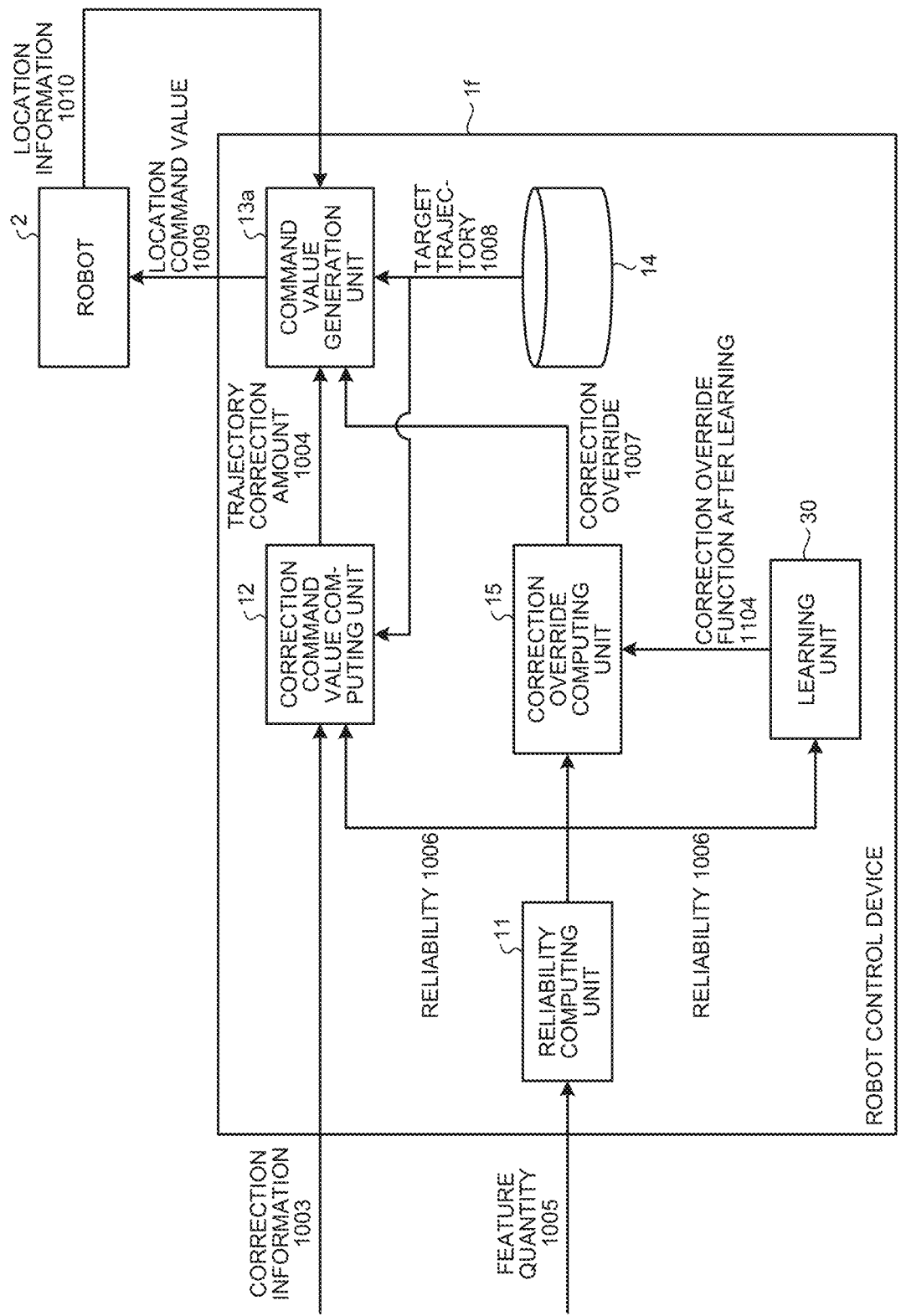
FIG. 33 is a diagram illustrating a configuration example of a robot control device according to a ninth embodiment.

FIG. 33 is a diagram illustrating a configuration example of a robot control device 1f according to a ninth embodiment. The robot control device 1f has a configuration in which a learning unit 30 is added to the robot control device 1a (see FIG. 15) according to the third embodiment. In FIG. 33, identical components to those of the robot control device 1a according to the third embodiment are denoted by the same reference symbols. In the present embodiment, portions different from those in the third embodiment will be described.

Figure 34:
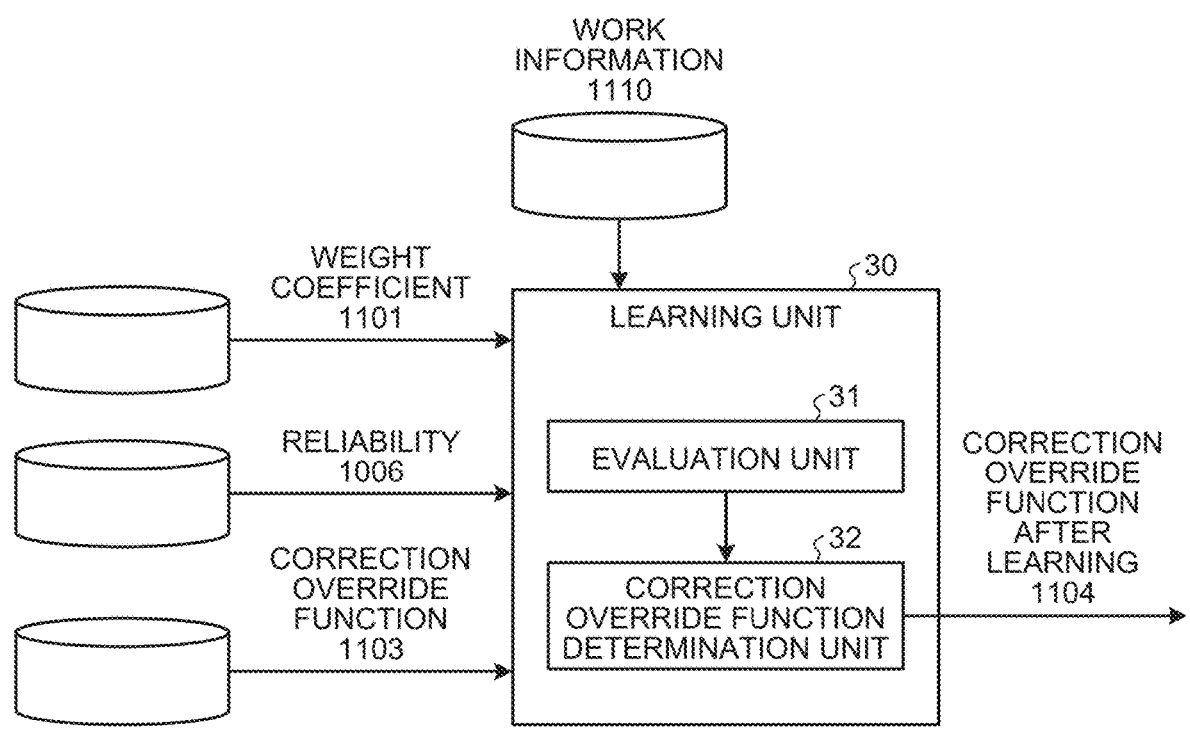
FIG. 34 is a diagram illustrating a configuration example of a learning unit of the robot control device according to the ninth embodiment.

FIG. 34 is a diagram illustrating a configuration example of the learning unit 30 of the robot control device 1f according to the ninth embodiment. The learning unit 30 includes an evaluation unit 31 and a correction override function determination unit 32. A correction override function 1103, the reliability 1006 (Pc(k)), the weight coefficient 1101, and the work information 1110 are inputted to the learning unit 30. The reliability 1006 (Pc(k)), the weight coefficient 1101, and the work information 1110 are identical to the reliability 1006 (Pc(k)), the weight coefficient 1101, and the work information 1110 to be inputted to the learning unit 20 described in the eighth embodiment.

In the learning unit 30, the evaluation unit 31 acquires the correction override function 1103 having a shorter work time and a higher work success rate through the machine learning on the basis of the work information 1110.

In this condition, the correction override function is made for defining a relationship between the reliability Pc(k) and the correction override. For the correction override function, the correction override function determination unit 32 selects a function definition of the correction override such that the work time is minimized while the work success rate is maximized in the processing of the command value generation unit 13a defined by the certain weight coefficient 1101, and outputs the accordingly-obtained result to the correction override computing unit 15 as a learned correction override function 1104 obtained after the learning. The correction override computing unit 15 holds a learning result obtained by the learning unit 30, that is, the learned correction override function 1104 obtained after the learning, and calculates the correction override 1007, in response to new input of the reliability 1006, on the basis of the inputted reliability 1006 and the held learned correction override function 1104 obtained after the learning.

For example, the correction override function 1104 may be defined as exemplified in Equations (14), (15), and (16) in the third and fourth embodiments. In particular, when there is the weight coefficient 1101, a method may be adopted in which the correction override computing unit 15 outputs a plurality of correction overrides OvrdC(k) for the sensor signal Sk, and the command value generation unit 13a selects the correction override OvrdC(k) corresponding to the correction information $\Delta Xck$ having the largest proportion in the trajectory correction amount $\Delta Xd$, from among the correction information $\Delta Xck$. Therefore, the correction override function 1104 needs to be defined as two functions for the weight coefficient 1101 and the reliability 1006. In the learning processing performed by the learning unit 30, various variations such as polynomials defined as these functions are trially performed using a simulation or an actual machine, and results of the trials are inputted to the learning unit 30. As a result, a result such that the highest evaluation value is obtained can be selected and outputted as the learned correction override function after the learning.

Note that, although the description in the present embodiment has been given assuming that the learning unit 30 is present inside the robot control device 1f, an alternative configuration may be adopted in which the learning unit 30 is present outside the robot control device 1f, for example, within a computer external thereto. In the latter case, after the machine learning is completed, the learning unit 30 sets the learned correction override function 1104 obtained after the learning acquired by the machine learning, in the correction override computing unit 15 of the robot control device 1f.

By the above-described configuration having been provided, a more effective function expression can be determined by using the machine learning in terms of a function expression, such as a correction override function, which usually has a complicated relationship and is difficult to obtain. As a result, adjustment with a high work success rate and a short work time can be realized, thereby leading to an effect of making it possible to improve production efficiency of the production system.

Note that, in the present embodiment, the configuration has been described in which the learning unit 30 is added to the robot control device 1a according to the third embodiment, but an alternative configuration may also be adopted in which the learning unit 30 is added to each of the robot control devices described in the fourth to sixth embodiments, that is, a robot control device having a correction override computing unit.

The configurations illustrated in the above embodiments illustrate just typical examples, and can each be combined with other publicly known techniques, but the embodiments can be combined with each other. Each of the configurations can be partially omitted and/or modified without departing from the scope of the present disclosure.

REFERENCE SIGNS LIST

1, 1a, 1b, 1c, 1d, 1e, 1f robot control device; 2 robot; 3 external sensor; 4 sensor controller; 11, 11d reliability computing unit; 12 correction command value computing unit; 13, 13a command value generation unit; 14 target trajectory holding unit; 15, 15b correction override computing unit; 16 feature quantity extraction unit; 20, 30 learning unit; 21, 31 evaluation unit; 22 weight coefficient determination unit; 32 correction override function determination unit; 100 robot system; 201 force sensor; 202-1, 202-2 vision sensor; 203-1 field of view; 300 object.

The invention claimed is:

1. A robot control device comprising:
a reliability computing circuit to which a feature quantity obtained from a sensor signal is inputted, to compute a reliability for the sensor signal based on a temporal change or a spatial change of the feature quantity, the sensor signal indicating a measurement result obtained by an external sensor installed in a main body of a robot or a surrounding environment of the robot;
a correction command value computing circuit to compute a trajectory correction amount for correcting a trajectory of the robot, based on the reliability and correction information that is calculated based on the feature quantity; and
a command value generation circuit to generate a location command value for the robot based on a target trajectory of the robot and the trajectory correction amount, the target trajectory being determined in advance.

2. The robot control device according to claim 1, wherein there is a plurality of external sensors each corresponding to the external sensor, and a plurality of feature quantities are inputted to the reliability computing circuit, the feature quantities being obtained from the sensor signals, respectively, the sensor signals being outputted from the external sensors, and
the reliability computing circuit computes the reliability, then corrects the reliability obtained by computation based on the feature quantities, and outputs the corrected reliability to the correction command value computing circuit.

3. The robot control device according to claim 1, comprising:
a correction override computing circuit to correct an override value of the location command value based on a history of the reliability, and output a correction override that is the corrected override value, to the command value generation circuit, wherein
the command value generation circuit generates the location command value based on the target trajectory, the trajectory correction amount, and the correction override.

4. The robot control device according to claim 1, comprising:
a correction override computing circuit to correct an override value of the location command value based on a history of the reliability, further adjust the corrected override value based on a feature quantity of a measurement result, and output a correction override that is the adjusted override value to the command value generation circuit, the measurement result being obtained by a second external sensor different from a first external sensor corresponding to the reliability, wherein
the command value generation circuit generates the location command value based on the target trajectory, the trajectory correction amount, and the correction override.

5. The robot control device according to claim 1, wherein distance information between a reference point of the robot and a target object is inputted to the command value generation circuit, the distance information being measured by the external sensor, and
the command value generation circuit generates the location command value based on the target trajectory, the trajectory correction amount, and the distance information.

6. The robot control device according to claim 1, comprising:
a feature quantity extraction circuit to use, as inputs, the sensor signals outputted from the external sensors, extract a feature quantity of each of the inputted sensor signals and output the feature quantity to the reliability computing circuit, calculate the correction information based on the extracted feature quantity and a predetermined target value, and output the correction information to the correction command value computing circuit.

7. The robot control device according to claim 1, wherein location information of the robot is inputted to the reliability computing circuit, and
the reliability computing circuit corrects the reliability obtained by computation based on the feature quantity, on the basis of a history of the location information, and output the corrected reliability to the correction command value computing circuit.

8. The robot control device according to claim 1, comprising:
a learning circuit to learn a weight coefficient representing a relationship among the trajectory correction amount, the correction information, and the reliability with using, as inputs, the reliability, the correction information, and work result information, based on the reliability, the correction information, and the work result information, the reliability and correction information being inputted to the correction command value computing circuit during a plurality of work trials, the work result information being obtained in each of the work trials, wherein
the correction command value computing circuit computes the trajectory correction amount with use of the learned weight coefficient.

9. The robot control device according to claim 3, comprising:
a learning circuit to learn a correction override function of calculating the correction override based on the reliability with using, as inputs, the reliability and work result information, based on the reliability and the work result information, the reliability being inputted to the correction override computing circuit during a plurality of work trials, the work result information being obtained in each of the work trials, wherein
the correction override computing circuit computes the correction override with use of the learned correction override function.

* * * * *